United States Patent
Kim et al.

(10) Patent No.: US 12,165,044 B2
(45) Date of Patent: Dec. 10, 2024

(54) TECHNOLOGY FOR LOWERING PEAK POWER OF NEURAL PROCESSING UNIT USING VARIABLE FREQUENCY

(71) Applicant: DEEPX CO., LTD., Seongnam-si (KR)

(72) Inventors: Lok Won Kim, Yongin-si (KR); Seong Jin Lee, Seongnam-si (KR)

(73) Assignee: DEEPX CO., LTD., Seongnam-si (KR)

(*) Notice: Subject to any disclaimer, the term of this patent is extended or adjusted under 35 U.S.C. 154(b) by 0 days.

(21) Appl. No.: 18/501,455

(22) Filed: Nov. 3, 2023

(65) Prior Publication Data
US 2024/0078418 A1 Mar. 7, 2024

(30) Foreign Application Priority Data
Sep. 19, 2023 (KR) .......... 10-2023-0124805

(51) Int. Cl.
G06N 3/063 (2023.01)
G06F 1/12 (2006.01)

(52) U.S. Cl.
CPC .......... *G06N 3/063* (2013.01); *G06F 1/12* (2013.01)

(58) Field of Classification Search
CPC .................. G06N 3/063; G06F 1/12
See application file for complete search history.

(56) References Cited

U.S. PATENT DOCUMENTS

| | | | | |
|---|---|---|---|---|
| 2009/0174441 A1* | 7/2009 | Gebara | ......... | H02M 3/073 327/295 |
| 2018/0253643 A1* | 9/2018 | Buchanan | ....... | G06F 7/5443 |
| 2018/0285726 A1* | 10/2018 | Baum | ....... | G06F 30/30 |
| 2019/0079801 A1* | 3/2019 | Lyuh | ....... | G06F 15/8046 |
| 2019/0235866 A1* | 8/2019 | Das Sarma | ....... | G06F 9/30018 |
| 2021/0174179 A1* | 6/2021 | Song | ....... | G06F 7/5443 |
| 2022/0004249 A1* | 1/2022 | Han | ....... | G06F 1/3296 |
| 2022/0138586 A1* | 5/2022 | Kim | ....... | G06N 3/10 |
| 2022/0206068 A1* | 6/2022 | Kim | ....... | G01R 31/31713 |
| 2022/0300418 A1* | 9/2022 | Baugh | ....... | G06F 12/0284 |
| 2023/0065725 A1* | 3/2023 | Badaroglu | ....... | G06N 3/063 |

(Continued)

FOREIGN PATENT DOCUMENTS

WO   WO-2022139666 A1 *  6/2022 .............. G06T 1/20

OTHER PUBLICATIONS

Kim, Lok-Won, Sameh Asaad, and Ralph Linsker. "A fully pipelined fpga architecture of a factored restricted boltzmann machine artificial neural network." ACM Transactions on Reconfigurable Technology and Systems (TRETS) 7.1 (2014): 1-23. (Year: 2014).*

(Continued)

*Primary Examiner* — Randall K. Baldwin
(74) *Attorney, Agent, or Firm* — Bridgeway IP Law Group, PLLC; Jihun Kim

(57) ABSTRACT

A system may comprise a neural processing unit (NPU) including a plurality of processing elements (PEs) capable of performing computations for at least one artificial neural network (ANN) model; and a switching circuit. The switching circuit may be configured to select one clock signal among a plurality of clock signals having different frequencies, and supply the selected clock signal to the NPU. The one clock signal may be selected based on a utilization rate of the plurality of PEs for a particular layer among a plurality of layers of the at least one ANN model.

18 Claims, 20 Drawing Sheets

(56) References Cited

U.S. PATENT DOCUMENTS

2023/0079975 A1* 3/2023 Saeed .................. G06N 3/048
713/320

OTHER PUBLICATIONS

Lane, Nicholas D., et al. "Deepx: A software accelerator for low-power deep learning inference on mobile devices." 2016 15th ACM/IEEE International Conference on Information Processing in Sensor Networks (IPSN). IEEE, 2016. (Year: 2016).*

Kim, Lok-Won. "DeepX: Deep learning accelerator for restricted boltzmann machine artificial neural networks." IEEE transactions on neural networks and learning systems 29.5 (2017): 1441-1453. (Year: 2017).*

Ishida, Koki, et al. "SuperNPU: An extremely fast neural processing unit using superconducting logic devices." 2020 53rd Annual IEEE/ACM International Symposium on Microarchitecture (Micro). IEEE, 2020: 58-72 (Year: 2020).*

Dhilleswararao, Pudi, et al. "Efficient hardware architectures for accelerating deep neural networks: Survey." IEEE Access (2022): 131788-131828. (Year: 2022).*

Medus, Leandro D., et al. "A novel systolic parallel hardware architecture for the FPGA acceleration of feedforward neural networks." IEEE Access 7 (2019): 76084-76103. (Year: 2019).*

Valencia, Daniel, Saeed Fouladi Fard, and Amir Alimohammad. "An artificial neural network processor with a custom instruction set architecture for embedded applications." IEEE Transactions on circuits and systems I: regular papers 67.12 (2020): 5200-5210. (Year: 2020).*

Capra, Maurizio, et al. "Hardware and software optimizations for accelerating deep neural networks: Survey of current trends, challenges, and the road ahead." IEEE Access 8 (2020): 225134-225180. (Year: 2020).*

Wang, Yang, et al. "PL-NPU: An energy-efficient edge-device DNN training processor with posit-based logarithm-domain computing." IEEE Transactions on Circuits and Systems I: Regular Papers 69.10 (2022): 4042-4055. (Year: 2022).*

Aung, Myat Thu Linn, et al. "DeepFire2: A convolutional spiking neural network accelerator on FPGAs." IEEE Transactions on Computers 72.10 (Oct. 2023): 2847-2857. (Year: 2023).*

Himavathi, S., D. Anitha, and A. Muthuramalingam. "Feedforward neural network implementation in FPGA using layer multiplexing for effective resource utilization." IEEE transactions on neural networks 18.3 (2007): 880-888. (Year: 2007).*

* cited by examiner

| Layer name | Input feature map | | | Kernel | | | Output feature map | | | #Strides | Algorithm | | amount of calculation | Data size (Byte) | | |
|---|---|---|---|---|---|---|---|---|---|---|---|---|---|---|---|---|
| | Height | Width | Ch # | Height | Width | # | Height | Width | Ch # | | AVG pooling | Activation | MAC | Kernel_SIZE | IFMAP_SIZE | OFMAP_SIZE |
| 1 | 224 | 224 | 3 | 3 | 3 | 32 | 112 | 112 | 32 | 2 | NO | RELU | 10,838,016 | 864 | 150,528 | 401,408 |
| 2 | 112 | 112 | 32 | 3 | 3 | 1 | 112 | 112 | 32 | 1 | NO | RELU | 3,612,672 | 288 | 401,408 | 401,408 |
| 3 | 112 | 112 | 32 | 1 | 1 | 64 | 112 | 112 | 64 | 1 | NO | RELU | 25,690,112 | 2,048 | 401,408 | 802,816 |
| 4 | 112 | 112 | 64 | 3 | 3 | 1 | 56 | 56 | 64 | 2 | NO | RELU | 1,806,336 | 576 | 802,816 | 200,704 |
| 5 | 56 | 56 | 64 | 1 | 1 | 128 | 56 | 56 | 128 | 1 | NO | RELU | 25,690,112 | 8,192 | 200,704 | 401,408 |
| 6 | 56 | 56 | 128 | 3 | 3 | 1 | 56 | 56 | 128 | 1 | NO | RELU | 3,612,672 | 1,152 | 401,408 | 401,408 |
| 7 | 56 | 56 | 128 | 1 | 1 | 128 | 56 | 56 | 128 | 1 | NO | RELU | 51,380,224 | 16,384 | 401,408 | 401,408 |
| 8 | 56 | 56 | 128 | 3 | 3 | 1 | 28 | 28 | 128 | 2 | NO | RELU | 903,168 | 1,152 | 401,408 | 100,352 |
| 9 | 28 | 28 | 128 | 1 | 1 | 256 | 28 | 28 | 256 | 1 | NO | RELU | 25,690,112 | 32,768 | 100,352 | 200,704 |
| 10 | 28 | 28 | 256 | 3 | 3 | 1 | 28 | 28 | 256 | 1 | NO | RELU | 1,806,336 | 2,304 | 200,704 | 200,704 |
| 11 | 28 | 28 | 256 | 1 | 1 | 256 | 28 | 28 | 256 | 1 | NO | RELU | 51,380,224 | 65,536 | 200,704 | 200,704 |
| 12 | 28 | 28 | 256 | 3 | 3 | 1 | 14 | 14 | 256 | 2 | NO | RELU | 451,584 | 2,304 | 200,704 | 50,176 |
| 13 | 14 | 14 | 256 | 1 | 1 | 512 | 14 | 14 | 512 | 1 | NO | RELU | 25,690,112 | 131,072 | 50,176 | 100,352 |
| 14 | 14 | 14 | 512 | 3 | 3 | 1 | 14 | 14 | 512 | 1 | NO | RELU | 903,168 | 4,608 | 100,352 | 100,352 |
| 15 | 14 | 14 | 512 | 1 | 1 | 512 | 14 | 14 | 512 | 1 | NO | RELU | 51,380,224 | 262,144 | 100,352 | 100,352 |
| 16 | 14 | 14 | 512 | 3 | 3 | 1 | 14 | 14 | 512 | 1 | NO | RELU | 903,168 | 4,608 | 100,352 | 100,352 |
| 17 | 14 | 14 | 512 | 1 | 1 | 512 | 14 | 14 | 512 | 1 | NO | RELU | 51,380,224 | 262,144 | 100,352 | 100,352 |
| 18 | 14 | 14 | 512 | 3 | 3 | 1 | 14 | 14 | 512 | 1 | NO | RELU | 903,168 | 4,608 | 100,352 | 100,352 |
| 19 | 14 | 14 | 512 | 1 | 1 | 512 | 14 | 14 | 512 | 1 | NO | RELU | 51,380,224 | 262,144 | 100,352 | 100,352 |
| 20 | 14 | 14 | 512 | 3 | 3 | 1 | 14 | 14 | 512 | 1 | NO | RELU | 903,168 | 4,608 | 100,352 | 100,352 |
| 21 | 14 | 14 | 512 | 1 | 1 | 512 | 14 | 14 | 512 | 1 | NO | RELU | 51,380,224 | 262,144 | 100,352 | 100,352 |
| 22 | 14 | 14 | 512 | 3 | 3 | 1 | 14 | 14 | 512 | 1 | NO | RELU | 903,168 | 4,608 | 100,352 | 100,352 |
| 23 | 14 | 14 | 512 | 1 | 1 | 512 | 14 | 14 | 512 | 1 | NO | RELU | 51,380,224 | 262,144 | 100,352 | 100,352 |
| 24 | 14 | 14 | 512 | 3 | 3 | 1 | 7 | 7 | 512 | 2 | NO | RELU | 225,792 | 4,608 | 100,352 | 25,088 |
| 25 | 7 | 7 | 512 | 1 | 1 | 1,024 | 7 | 7 | 1,024 | 1 | NO | RELU | 25,690,112 | 524,288 | 25,088 | 50,176 |
| 26 | 7 | 7 | 1,024 | 3 | 3 | 1 | 7 | 7 | 1,024 | 1 | NO | RELU | 451,584 | 9,216 | 50,176 | 50,176 |
| 27 | 7 | 7 | 1,024 | 1 | 1 | 1,024 | 7 | 7 | 1,024 | 1 | YES | RELU | 51,380,224 | 1,048,576 | 50,176 | 1,024 |
| 28 | 1 | 1 | 1,024 | 1 | 1 | 1,000 | 1 | 1 | 1,000 | 1 | NO | NO | 1,024,000 | 1,024,000 | 1,024 | 1,000 |

FIG. 6B

TECHNOLOGY FOR LOWERING PEAK POWER OF NEURAL PROCESSING UNIT USING VARIABLE FREQUENCY

CROSS-REFERENCE TO RELATED APPLICATIONS

This application claims the priority of Korean Patent Application No. 10-2023-0124805 filed on Sep. 19, 2023, in the Korean Intellectual Property Office, the disclosure of which is incorporated herein by reference.

BACKGROUND OF THE DISCLOSURE

Technical Field

The present disclosure relates to a technique for lowering power of a neural processing unit by using variable frequency.

Background Art

Artificial intelligence (AI) is rapidly advancing. AI refers to artificially imitating human intelligence, that is, intelligence capable of recognition, classification, inference, prediction, control/decision making, and the like.

In recent times, to enhance the computational speed for artificial intelligence (AI), a neural processing unit (NPU) has been developed.

Depending on the specific AI service requirements, different types of artificial neural network (ANN) models may exist. For instance, when processing an image or video, a CNN type artificial neural network model can be employed for tasks like object classification, object detection, object tracking, and the like.

Generally, each layer of an artificial neural network model involves varying levels of computation.

In particular, when a specific layer requires a significant increase in computational operations, it can lead to an instantaneous surge in power consumption.

SUMMARY OF THE DISCLOSURE

Artificial neural network operation has a data-intensive characteristic. In particular, artificial neural network calculations require parallel processing calculations. In other words, the artificial neural network operation has a characteristic in that the processing speed is lowered if a large amount of data cannot be processed in parallel at a high speed at the same time.

Accordingly, the inventors of the present disclosure developed a neural processing unit specialized for artificial neural network calculation. The inventors of the present disclosure have attempted to improve the parallel processing performance of the neural processing unit by increasing the number of a plurality of processing elements of the neural processing unit. In addition, the inventors of the present disclosure have attempted to develop a neural processing unit capable of low-power operation.

Meanwhile, a power supply unit of a neural processing unit specialized for low-power operation installed in an edge device may have relatively low power supply capability compared to a power supply unit of a graphic processing unit (GPU) operating in a server or personal computer (PC). In addition, capacitance of a power supply unit of a neural processing unit specialized for low-power operation installed in an edge device may be insufficient to handle peak power supply.

However, the inventors of the present disclosure have recognized that as the number of processing elements of the neural processing unit specialized for low-power operation increases, the degree of instantaneously fluctuating supply voltage may increase. In other words, the required amount of instantaneous power supply of the neural processing unit may be proportional to the number of operating processing elements. In addition, the amount of computation of the artificial neural network model varies considerably for each layer. Therefore, the number of processing elements operating in parallel may be different according to the amount of computation of the layer of the artificial neural network model. That is, when many processing elements operate at the same time, the voltage of the power supply unit of the neural processing unit may fluctuate or drop instantaneously.

Additionally, the computational amount of a specific layer of an artificial neural network model may be very small. In this case, the inventors of the present disclosure have recognized that supply voltage stability of the neural processing unit can be guaranteed even if the driving frequency of the neural processing unit is increased.

In addition, when the supply voltage fluctuates or drops instantaneously, there may be a case in which the supply voltage VDD needs to be raised for system stability. Therefore, if system safety is not secured, a problem in which the supply voltage is unnecessarily increased may occur. When the supply voltage increases, power consumption of the neural processing unit may rapidly increase. In this case, the inventors of the present disclosure have recognized that the voltage of the power supply of the neural processing unit can be stabilized by reducing the driving frequency of the neural processing unit.

Conversely, as the supply voltage becomes more stable, a level of the supply voltage VDD can be reduced. Therefore, if the stability of the supply voltage of the neural processing unit is ensured, the supply voltage can be reduced, and consequently, the power consumption of the neural processing unit can be reduced.

Accordingly, the inventors of the present disclosure recognized that it is necessary to improve the stability of the supply voltage of a neural processing unit specialized for artificial neural network calculation by adjusting the driving frequency when the amount of calculation increases rapidly.

Accordingly, the disclosures of the present disclosure aim to present technical methods for stabilizing the fluctuation of the supply voltage of the supply power unit due to excessive power in a specific operation step.

According to an example of the present disclosure, a system may be provided. The system may comprise a neural processing unit (NPU) including a plurality of processing elements (PEs) capable of performing computations for at least one artificial neural network (ANN) model; and a switching circuit. The switching circuit may be configured to select one clock signal among a plurality of clock signals having different frequencies, and supply the selected clock signal to the NPU. The one clock signal is selected based on a utilization rate of the plurality of PEs for a particular layer among a plurality of layers of the at least one ANN model.

A threshold value may be determined for the utilization rate of the plurality of PEs to reduce power of performing operations on the particular layer.

When the NPU has completed computation on a layer earlier than the particular layer of the at least one ANN model, the one clock signal may be selected.

The one clock signal may be selected for the particular layer of the at least one ANN model based on information of from an output of a layer of earlier than the particular layer processed by the NPU.

The switching circuit may include a generator configured to output the plurality of clock signals and a selector configured to select the one clock signal.

If the utilization rate for the particular layer is higher than a utilization rate for a previous layer, the one clock signal selected for the particular layer may have a second frequency lower than a first frequency of the previous layer.

If the utilization rate for the particular layer is lower than a utilization rate for a previous layer, the one clock signal selected for the particular layer may have a second frequency higher than a first frequency of the previous layer.

The utilization rate of the plurality of PEs may be determined for each of the plurality of layers of the at least one ANN model.

The utilization rate of the plurality of PEs may be determined based on scheduling information used to assign operations for each layer of the at least one ANN model to the plurality of PEs.

According to an example of the present disclosure a system-on-chip (SoC) may be provided. The SoC may comprise a first circuitry including a plurality of processing elements (PEs) capable of performing computations for at least one artificial neural network (ANN) model; and a second circuitry configured to select one clock signal among a plurality of clock signals having different frequencies, and supply the selected clock signal to the first circuitry. The one clock signal may be selected based on a utilization rate of the plurality of PEs for a particular layer among a plurality of layers of the at least one ANN model.

The one clock signal may be selected by further considering a threshold value of the utilization rate of the plurality of PEs.

A threshold value may be determined for the utilization rate of the plurality of PEs to reduce power of performing operations on the particular layer.

When the first circuitry has completed computation on a layer earlier than the particular layer of the at least one ANN model, the one clock signal may be selected.

The one clock signal may be selected for the particular layer of the at least one ANN model based on information from an output of a layer earlier than the particular layer processed by the first circuitry.

If the utilization rate for the particular layer is higher than a utilization rate for a previous layer, the one clock signal selected for the particular layer may have a second frequency lower than a first frequency of the previous layer.

If the utilization rate for the particular layer is lower than a utilization rate for a previous layer, the one clock signal selected for the particular layer may have a second frequency higher than a first frequency of the previous layer.

According to an example of the present disclosure, a method of operating a neural processing unit (NPU) may be provided. The method may comprise selecting one clock signal from a plurality of clock signals having different frequencies; and supplying the selected clock signal to the NPU. The NPU may include a plurality of processing elements (PEs) capable of performing operations for at least one artificial neural network (ANN) model. The one clock signal may be selected based on a utilization rate of the plurality of PEs for a particular layer among the plurality of layers in the at least one ANN model.

The one clock signal may be selected by further considering a threshold value of the utilization rate of the plurality of PEs.

A threshold value may be determined for the utilization rate of the plurality of PEs to reduce power of performing operations on the particular layer.

According to the examples of the present disclosure, artificial neural network operations are distributed according to different frequencies, which has the effect of lowering the power of a specific operation step.

According to examples of the present disclosure, artificial neural network operations are distributed and operated according to different frequencies, which has the effect of improving the safety of the supply voltage supplied to the neural processing unit.

According to the examples of the present disclosure, the artificial neural network operations are distributed according to a plurality of clock signals, so that the power consumption of the neural processing unit can be significantly reduced by reducing the supply voltage supplied to the neural processing unit.

BRIEF DESCRIPTION OF THE DRAWINGS

FIG. 6B is an exemplary table showing the size of data for each layer in the exemplary artificial neural network model shown in FIG. 6A.

DETAILED DESCRIPTION OF THE EMBODIMENT

Figure 1:
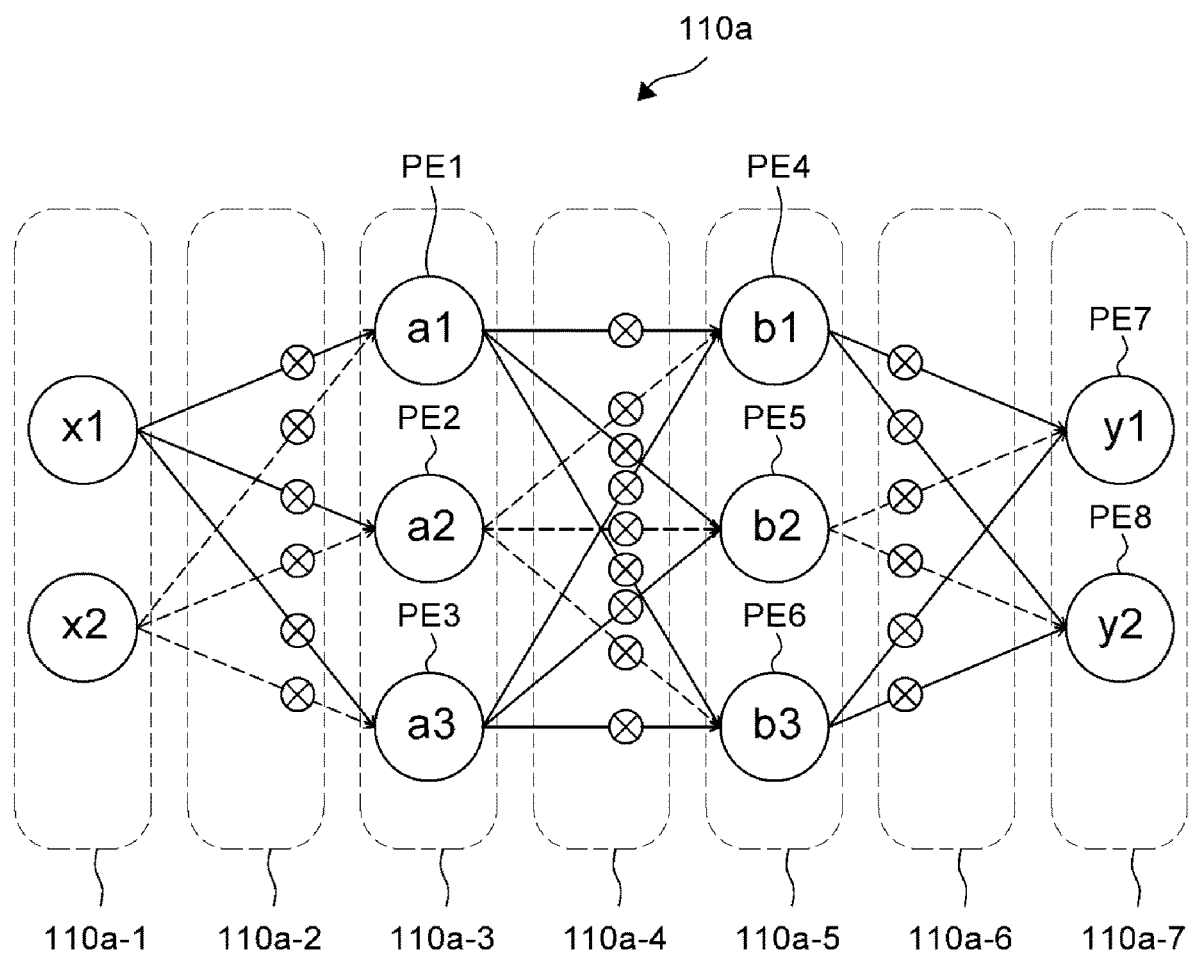
FIG. 1 is a schematic conceptual diagram illustrating an exemplary artificial neural network model.

Specific structural or step-by-step descriptions for the embodiments according to the concept of the present disclosure disclosed in the present disclosure or application are merely illustrative for the purpose of describing the embodiments according to the concept of the present disclosure. The examples according to the concept of the present disclosure may be carried out in various forms and are not interpreted as that the present disclosure is limited to the examples described in the present disclosure or application.

Various modifications and changes may be applied to the examples in accordance with the concept of the present disclosure and the examples may have various forms so that the examples will be described in detail in the specification or the application with reference to the drawings. However, it should be understood that the examples according to the concept of the present disclosure is not limited to the specific examples, but includes all changes, equivalents, or alternatives which are in line with the spirit and technical scope of the present disclosure.

Terminologies such as first and/or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween. Other expressions which describe the relationship between components, for example, "between," "adjacent to," and "directly adjacent to" should be interpreted in the same manner.

Terminologies used in the present disclosure are used only to describe specific examples, and are not intended to limit the present disclosure. A singular form may include a plural form if there is no clearly opposite meaning in the context. In the present disclosure, it should be understood that terms "include" or "have" indicate that a feature, a number, a step, an operation, a component, a part, or a combination thereof described in the present disclosure is present, but do not exclude a possibility of presence or addition of one or more other features, numbers, steps, operations, components, parts, or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if it is not clearly defined in the present disclosure.

In describing examples, descriptions of technical contents that are well known in the art to which the present disclosure pertains and are not directly related to the present disclosure will be omitted. The omission is to convey the gist of the present disclosure more clearly without the obscuration of the unnecessary description of well-known technical details.

<Definitions of Terms>

Here, in order to help the understanding of the examples proposed in the present disclosure, terminologies used in the present disclosure will be defined in brief.

NPU is an abbreviation for a neural processing unit and refers to a processor specialized for an operation of an artificial neural network model separately from the central processor (CPU).

ANN is an abbreviation for an artificial neural network and refers to a network which connects nodes in a layered structure by imitating the connection of the neurons in the human brain through a synapse to imitate the human intelligence.

DNN is an abbreviation for a deep neural network and may mean that the number of hidden layers of the artificial neural network is increased to implement higher artificial intelligence.

CNN is an abbreviation for a convolutional neural network and is a neural network which functions similar to the image processing performed in a visual cortex of the human brain. The convolutional neural network is known to be appropriate for image processing and is known to be easy to extract features of input data and identify the pattern of the features.

Hereinafter, the present disclosure will be described in detail by explaining examples of the present disclosure with reference to the accompanying drawings.

<Artificial Intelligence>

Humans are equipped with intelligence capable of recognition, classification, inference, prediction, control/decision making, and the like. Artificial intelligence (AI) refers to the artificial imitation of human intelligence.

The human brain consists of numerous nerve cells called neurons. Each neuron is connected to hundreds to thousands of other neurons through connections called synapses. In order to imitate human intelligence, modeling the operating principle of biological neurons and the connection between neurons is called an artificial neural network model. In other words, an artificial neural network is a system in which nodes that imitate neurons are connected in a layer structure.

These artificial neural network models are divided into 'single-layer neural networks' and 'multi-layer neural network' according to the number of layers. A typical multi-layer neural network consists of an input layer, a hidden layer, and an output layer. (1) The input layer is a layer that receives external data, and the number of neurons in the input layer is the same as the number of input variables. (2) The hidden layer is located between the input layer and the output layer, receives signals from the input layer, extracts characteristics, and transfers them to the output layer. (3) The output layer receives signals from the hidden layer and outputs the result. The input signal between neurons is multiplied by each connection weight having a value between 0 and 1 and summed. If this sum is greater than the neuron's threshold, the neuron is activated and implemented as an output value through an activation function.

Meanwhile, in order to implement higher artificial intelligence, an artificial neural network in which the number of hidden layers is increased is called a deep neural network (DNN).

DNNs are being developed in various structures. For example, a convolutional neural network (CNN), which is an example of DNN, is known to be easy to extract features of an input value (video or image) and identify a pattern of the extracted output value. A CNN may be configured in a form in which a convolution operation, an activation function operation, a pooling operation, and the like are processed in a specific order.

For example, in each layer of the DNN, parameters (i.e., input values, output values, weights or kernels, and the like) may be a matrix composed of a plurality of channels. Parameters can be processed in the NPU by convolution or matrix multiplication. In each layer, an output value that has been processed is generated.

For example, a transformer is a DNN based on attention technology. Transformers utilize a number of matrix multiplication operations. The transformer may obtain an output value of attention (Q, K, V) by using parameters such as an input value and a query (Q), a key (K), and a value (V). The transformer can process various inference operations based on the output value (i.e., attention (Q, K, V)). Transformers tend to show better inference performance than CNNs.

FIG. 1 illustrates an exemplary artificial neural network model.

Hereinafter, an operation of an exemplary artificial neural network model 110a which may operate in the neural processing unit 100 will be explained.

The exemplary artificial neural network model 110a of FIG. 1 may be an artificial neural network trained to perform various inference functions such as object detection or voice recognition.

The artificial neural network model 110a may be a deep neural network (DNN).

However, the artificial neural network model 110a according to the examples of the present disclosure is not limited to the deep neural network.

For example, the artificial neural network model can be a model such as ViT, DaViT, MobileViT, S win-Transformer, Transformer, YOLO (You Only Look Once), CNN, PIDNet, BiseNet, RCNN, VGG, VGG16, DenseNet, SegNet, DeconvNet, DeepLAB V3+, U-net, SqueezeNet, Alexnet, ResNet18, MobileNet-v2, GoogLeNet, Resnet-v2, Resnet50, Resnet101, Inception-v3, and the like. However, the artificial neural network model 110a may be an ensemble model based on at least two different models.

Hereinafter, an inference process by the exemplary artificial neural network model 110a will be described.

The artificial neural network model 110a may be an exemplary deep neural network model including an input layer 110a-1, a first connection network 110a-2, a first hidden layer 110a-3, a second connection network 110a-4, a second hidden layer 110a-5, a third connection network 110a-6, and an output layer 110a-7. However, the present disclosure is not limited only to the artificial neural network model illustrated in FIG. 1. The first hidden layer 110a-3 and the second hidden layer 110a-5 may also be referred to as a plurality of hidden layers.

The input layer 110a-1 may exemplarily include input nodes x1 and x2. That is, the input layer 110a-1 may include information about two input values.

For example, the first connection network 110a-2 may include information about six weight values for connecting nodes of the input layer 110a-1 to nodes of the first hidden layer 110a-3, respectively. Each weight value is multiplied with the input node value, and an accumulated value of the multiplied values is stored in the first hidden layer 110a-3. Here, the nodes and weights may be referred to as parameters.

For example, the first hidden layer 110a-3 may include nodes a1, a2, and a3. That is, the first hidden layer 110a-3 may include information about three node values.

The first processing element PE1 of FIG. 1 may perform the MAC operation of the a1 node.

The second processing element PE2 of FIG. 1 may perform the MAC operation of the a2 node.

The third processing element PE3 of FIG. 1 may perform the MAC operation of the a3 node.

For example, the second connection network 110a-4 may include information about nine weight values for connecting nodes of the first hidden layer 110a-3 to nodes of the second hidden layer 110a-5, respectively. The weight value of the second connection network 110a-4 is multiplied with the node value input from the corresponding first hidden layer 110a-3 and the accumulated value of the multiplied values is stored in the second hidden layer 110a-5.

For example, the second hidden layer 110a-5 may include nodes b1, b2, and b3. That is, the second hidden layer 110a-5 may include information about three node values.

The fourth processing element PE4 of FIG. 1 may process the operation of the b1 node. The fifth processing element PE5 of FIG. 1 may process the operation of node b2.

The sixth processing element PE6 of FIG. 1 may process the operation of node b3.

For example, the third connection network 110a-6 may include information about six weight values which connect nodes of the second hidden layer 110a-5 and nodes of the output layer 110a-7, respectively. The weight value of the third connection network 110a-6 is multiplied with the node value input from the second hidden layer 110a-5, and the accumulated value of the multiplied values is stored in the output layer 110a-7.

For example, the output layer 110a-7 may include nodes y1 and y2. That is, the output layer 110a-7 may include information about two node values.

The seventh processing element PE7 of FIG. 1 may process the operation of node y1.

The eighth processing element PE8 of FIG. 1 may process the operation of node y2.

Each node may correspond to a feature value, and the feature value may correspond to a feature map.

Figure 2A:
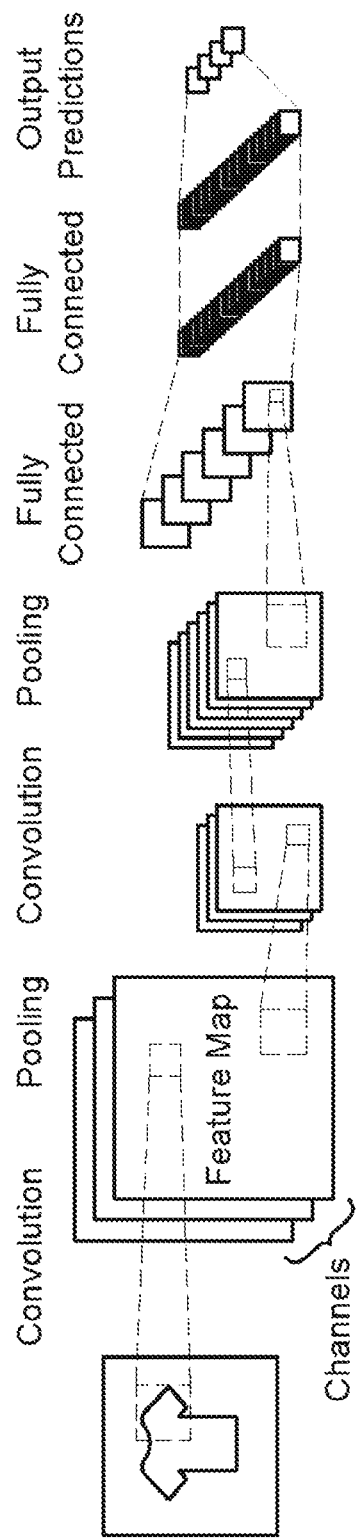
FIG. 2A is a diagram for explaining the basic structure of a convolutional neural network (CNN).

FIG. 2A is a diagram for explaining the basic structure of a convolutional neural network (CNN).

Referring to FIG. 2A, an input image may be displayed as a two-dimensional matrix composed of rows of a specific size and columns of a specific size. An input image may have a plurality of channels, where the channels may represent the number of color components of the input data image.

The convolution process means performing a convolution operation with a kernel while traversing the input image at specified intervals.

A convolutional neural network may have a structure in which an output value (convolution or matrix multiplication) of a current layer is transferred as an input value of a next layer.

For example, convolution is defined by two main parameters (input feature map and kernel). Parameters may include input feature maps, output feature maps, activation maps, weights, kernels, attention (Q, K, V) values, and the like.

Convolution slides the kernel window over the input feature map. The step size by which the kernel slides over the input feature map is called the stride.

After convolution, pooling may be applied. In addition, a fully-connected (FC) layer may be disposed at an end of the convolutional neural network.

Figure 2B:
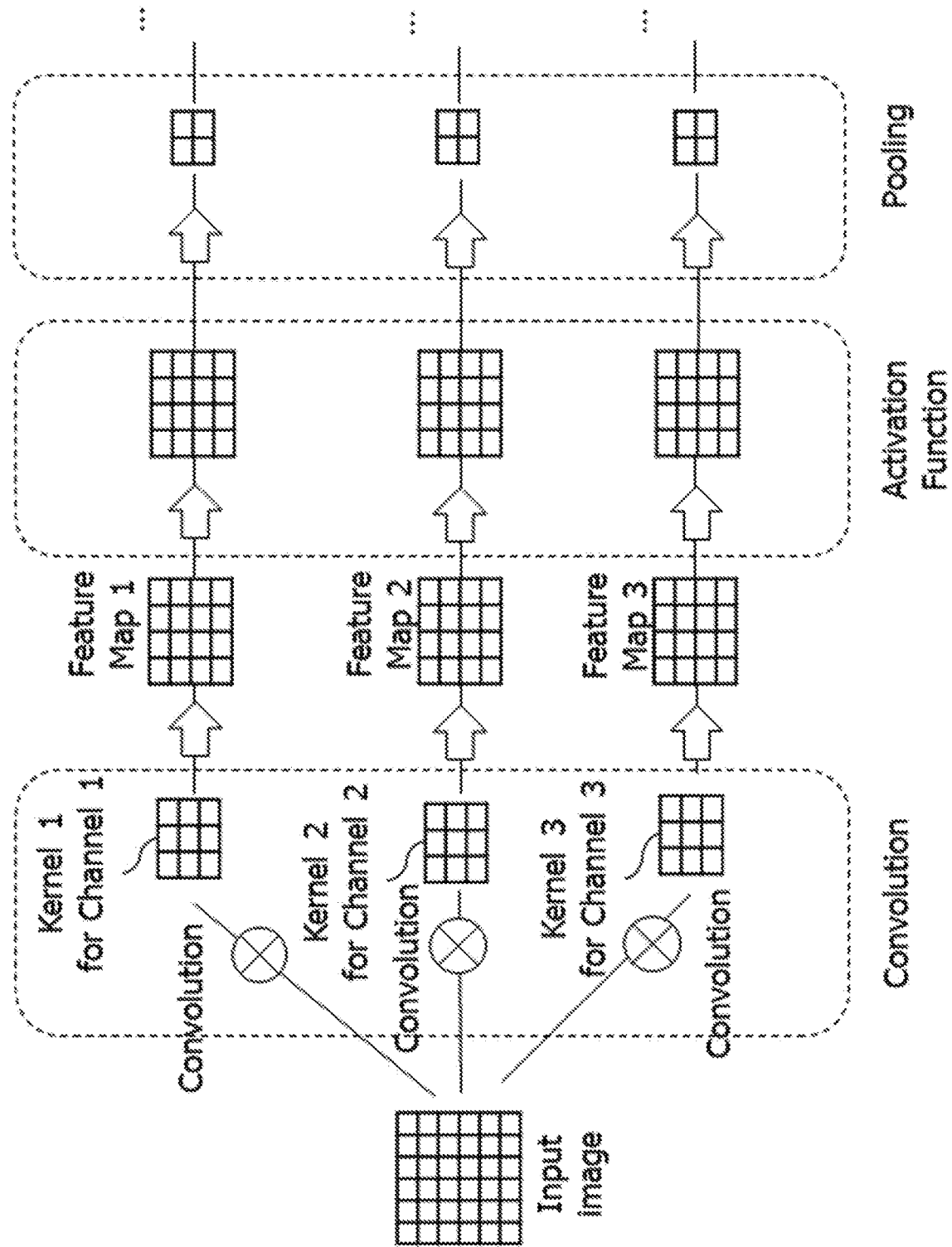
FIG. 2B is a comprehensive diagram showing the operation of a convolutional neural network.

FIG. 2B is a comprehensive diagram showing the operation of a convolutional neural network.

Referring to FIG. 2B, an input image is exemplarily represented as a two-dimensional matrix having a size of 6×6. In addition, FIG. 2B exemplarily illustrates three nodes, channel 1, channel 2, and channel 3.

First, the convolution operation will be described.

The input image (shown as an example of size 6×6 in FIG. 2B) is convolved with a kernel 1 (shown as an example of size 3×3 in FIG. 2B) for channel 1 at the first node, resulting in the output feature map 1 (shown as an example of size 4×4 in FIG. 2B). Similarly, the input image (shown as an example of size 6×6 in FIG. 2B) is convolved with a kernel 2 (shown as an example of size 3×3 in FIG. 2B) for channel 2 at the second node, resulting in the output feature map 2 (shown as an example of size 4×4 in FIG. 2B). Additionally, the input image is convolved with a kernel 3 (shown as an example of size 3×3 in FIG. 2B) for channel 3 at the third node, resulting in the output feature map 3 (shown as an example of size 4×4 in FIG. 2B).

To process each convolution, the processing elements PE1 to PE12 of the neural processing unit 100 are configured to perform a MAC operation.

Next, the operation of the activation function will be described.

The feature map 1, the feature map 2, and the feature map 3 (which are represented as 4×4 examples in FIG. 2B) generated from convolutional operations can be subjected to activation functions. The output after the activation function is applied may have a size of 4×4, for example.

Next, a pooling operation will be described.

Feature map 1, feature map 2, and feature map 3 output from the activation function (each size is exemplarily represented as 4×4 in FIG. 2B) are input to three nodes. Pooling may be performed by receiving feature maps output from the activation function as inputs. The pooling may reduce the size or emphasize a specific value in the matrix. Pooling methods include maximum pooling, average pooling, and minimum pooling. Maximum pooling is used to collect the maximum values in a specific region of the matrix, and average pooling can be used to find the average within a specific region.

In the example of FIG. 2B, it is shown that a feature map having a size of 4×4 is reduced to a size of 2×2 by pooling.

Specifically, the first node receives feature map 1 for channel 1 as an input, performs pooling, and outputs, for example, a 2×2 matrix. The second node receives feature map 2 for channel 2 as an input, performs pooling, and outputs, for example, a 2×2 matrix. The third node receives feature map 3 for channel 3 as an input, performs pooling, and outputs, for example, a 2×2 matrix.

The aforementioned convolution, activation function, and pooling are repeated, and finally, it can be output as fully connected. The corresponding output may be input again to an artificial neural network for image recognition. However, the present disclosure is not limited to the sizes of feature maps and kernels.

The CNN described so far is the most used method in the field of computer vision among various deep neural network (DNN) methods. In particular, CNNs have shown remarkable performance in various research areas performing various tasks such as image classification and object detection.

<Required Hardware Resources for ANN>

Figure 3:
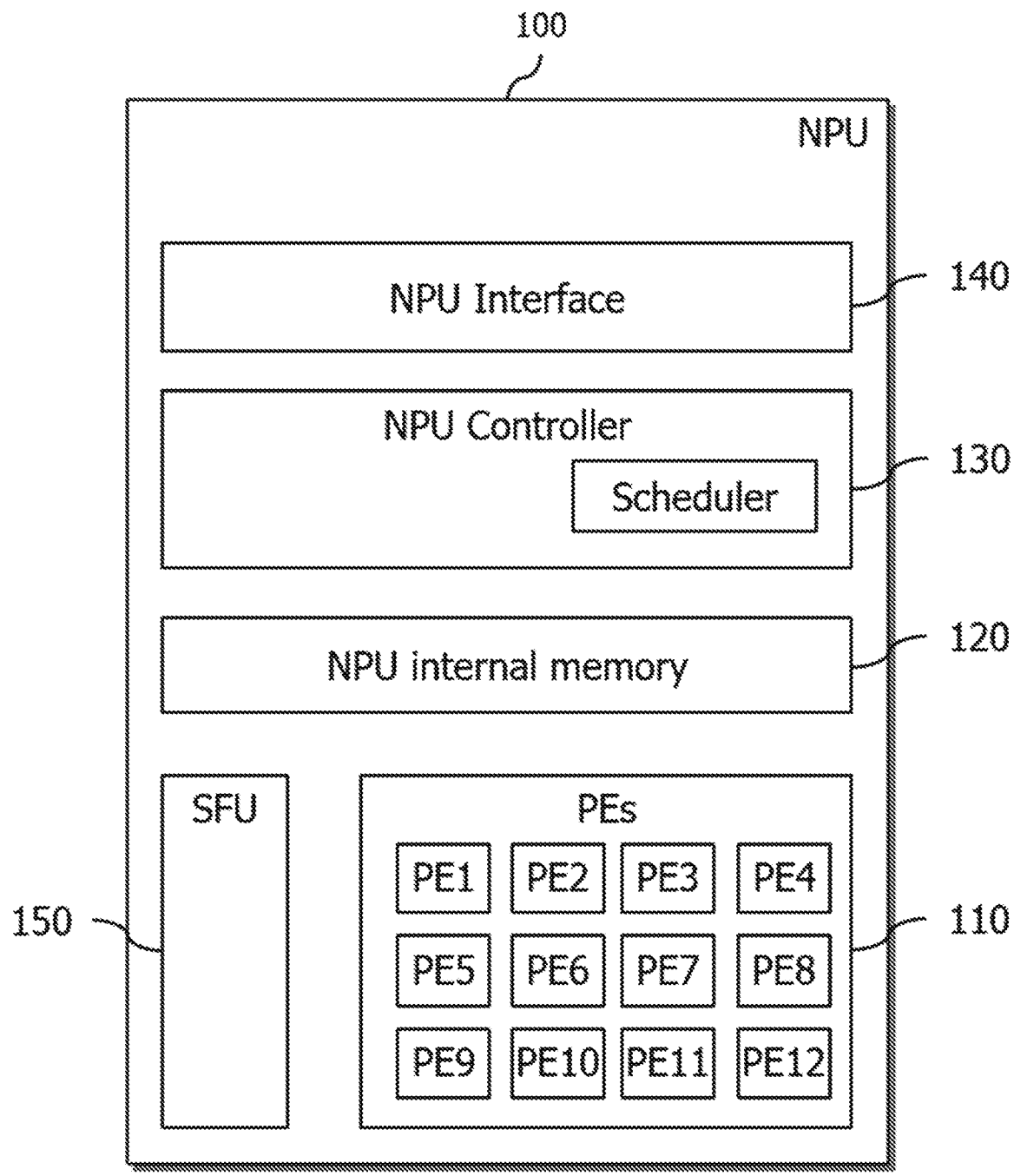
FIG. 3 is a schematic conceptual diagram illustrating a neural processing unit according to an example of the present disclosure.

FIG. 3 is a schematic conceptual diagram illustrating a neural processing unit according to the present disclosure.

Referring to FIG. 3, a neural processing unit (NPU) 100 is a processor specialized to perform an operation for an artificial neural network.

The artificial neural network refers to a network that consists of artificial neurons which, when receiving various inputs or entry stimulations, multiply a weight by the inputs or stimulations, add the multiplied values, and convert a value obtained by additionally adding a deviation using an active function to transmit. The artificial neural network trained as described above may be used to output an inference result from input data.

The neural processing unit 100 may be a semiconductor device implemented by an electric/electronic circuit. The electric/electronic circuit may refer to a circuit including a large number of electronic elements (transistors, capacitors, and the like).

In the case of a transformer and/or CNN-based artificial neural network model, the neural processing unit 100 may select and process matrix multiplication operations, convolution operations, and the like according to the architecture of the artificial neural network.

For example, in each layer of a convolutional neural network (CNN), an input feature map corresponding to input data and a kernel corresponding to weights may be a tensor or matrix composed of a plurality of channels. A convolution operation between the input feature map and the kernel is performed, and a convolution operation and a pooled output feature map are generated in each channel. An activation map of a corresponding channel is generated by applying an activation function to the output feature map. After that, pooling for the activation map may be applied. Here, the activation map may be collectively referred to as an output feature map. For convenience of explanation, the activation map may be referred to as an output feature map.

However, examples of the present disclosure are not limited thereto, and the output feature map means that a matrix multiplication operation or a convolution operation is applied.

To elaborate, the output feature map according to the examples of the present disclosure should be interpreted in a comprehensive sense. For example, the output feature map may be a result of a matrix multiplication operation or a convolution operation. Accordingly, the plurality of processing elements 110 may be modified to further include processing circuitry for processing additional algorithms. That is, some circuit units of the SFU 150 to be described later may be configured to be included in the plurality of processing elements 110.

The neural processing unit 100 may be configured to include a plurality of processing elements 110 for processing convolution and matrix multiplication necessary for the above-described artificial neural network operation.

The neural processing unit 100 may be configured to include each processing circuit optimized for matrix-multiplication operation, convolution operation, activation function operation, pooling operation, stride operation, batch-normalization operation, skip-connection operation, concatenation operation, quantization operation, clipping operation, padding operation, and the like required for the above-described artificial neural network operation.

For example, the neural processing unit 100 may be configured to include the SFU 150 for processing at least one of activation function operation, pooling operation, stride operation, batch-normalization operation, skip-connection operation, concatenation operation, quantization operation, clipping operation, and padding operation for the above-described algorithms.

The neural processing unit 100 may include a plurality of processing elements (PE) 110, an NPU internal memory 120, an NPU controller 130, and an NPU interface 140. Each of the plurality of processing elements 110, the NPU internal memory 120, the NPU controller 130, and the NPU interface 140 may be a semiconductor circuit to which a large number of the electronic elements are connected. Therefore, some of electronic elements may be difficult to identify or be distinguished with the naked eye, but may be identified only by a circuitry operation.

For example, an arbitrary circuit may operate as a plurality of the processing elements 110, or may operate as an NPU controller 130. The NPU controller 130 may be configured to perform the function of the control unit that is configured to control the artificial neural network inference operation of the neural processing unit 100.

The neural processing unit 100 may include a NPU controller 130 including an NPU internal memory 120 configured to store parameters of an artificial neural network model that can be inferred from the plurality of processing elements 110 and the SFU 150 and a scheduler configured to control operation schedules of the plurality of processing elements 110, the SFU 150, and the NPU internal memory 120.

The neural processing unit 100 may be configured to process the feature map corresponding to the encoding and decoding method using scalable video coding (SVC) or scalable feature-map coding (SFC). The above schemes are technologies that variably vary the data transmission rate according to the effective bandwidth and signal to noise ratio (SNR) of a communication channel or communication bus. That is, the neural processing unit 100 may be configured to further include an encoder and a decoder.

The plurality of processing elements 110 may perform a portion of the operations for an artificial neural network.

SFU 150 may perform another portion of the operation for the artificial neural network.

The neural processing unit 100 may be configured to hardware-accelerate the computation of the artificial neural network model using the plurality of processing elements 110 and the SFU 150.

The NPU interface 140 may communicate with various components connected to the neural processing unit 100, for example, memories, via a system bus.

The NPU controller 130 may include a scheduler configured to control the operation of multiple processing elements 110 for inference operations of a neural processing unit 100, as well as operations of the SFU 150 and reading and writing order of the internal memory 120 of the NPU.

The scheduler in the NPU controller 130 may be configured to control the plurality of processing elements 110, the SFU 150, and the NPU internal memory 120 based on data locality information or structure information of the artificial neural network model.

The schedular in the NPU controller 130 may analyze or receive analyzed information on a structure of an artificial neural network model which may operate in the plurality of processing elements 110. The analyzed information may be information generated by a compiler. For example, data of the artificial neural network, which may be included in the artificial neural network model may include node data (i.e., feature map) of each layer, data on a layout of layers, locality information of layers or information about the structure, and at least a portion of weight data (i.e., weight kernel) of each of connection networks connecting the nodes of the layers. The data of the artificial neural network may be stored in a memory provided in the NPU controller 130 or the NPU internal memory 120. However, it is not limited thereto, and the data of the artificial neural network may be stored in a separate cache memory or register file provided in the NPU or SoC including the NPU.

A scheduler within the NPU controller 130 may schedule the sequence of computations of the artificial neural network model to be performed by the neural processing unit 100 based on information about data locality or structure of the artificial neural network model.

The scheduler in the NPU controller 130 may receive scheduling information of an operation sequence of the artificial neural network model to be performed by the neural processing unit 100 based on data locality information or structure information of the compiled artificial neural network model. For example, the scheduling information may be information generated by a compiler. Scheduling information generated by the compiler may be referred to as machine code or binary code.

That is, the scheduling information utilized by the NPU controller 130 may be information generated by a compiler based on data locality information or structure of an artificial neural network model.

In other words, the compiler can efficiently schedule for a neural processing unit depending on how well the compiler understands and reconstructs the locality of artificial neural network data, which is a unique characteristic of artificial neural network models.

In other words, the compiler can efficiently schedule for the neural processing unit according to how well the compiler understands the hardware structure and performance of the neural processing unit 100.

In other words, when the artificial neural network model is compiled to be executed in the neural processing unit 100 by the compiler, the artificial neural network data locality may be reconstructed. The artificial neural network data locality can be reconstructed according to the algorithms applied to the artificial neural network model and the operating characteristics of the processor.

To elaborate, the artificial neural network data locality can be reconstructed according to a method in which the neural processing unit 100 processes the corresponding artificial neural network model, for example, feature map tiling or a stationary method of processing elements.

To elaborate, artificial neural network data locality can be reconstructed according to the number of processing elements of the neural processing unit 100 and the capacity of the internal memory.

To elaborate, the artificial neural network data locality can be reconstructed according to the bandwidth of the memory communicating with the neural processing unit 100.

This is because the neural processing unit 100 may differently determine the order of necessary data at each moment in each clock cycle even though the same artificial neural network model is operated and processed by each of the factors described above.

Based on the order of data required for the operation of the artificial neural network model, the compiler may determine data locality and generate compiled machine code based on the order of operation of the layers, convolutions and/or matrix multiplications of the artificial neural network.

The scheduler may be configured to utilize scheduling information contained in machine code. The scheduler in the NPU controller 130 may obtain a memory address value in which the feature map and weight data of the layer of the artificial neural network model are stored based on the scheduling information.

For example, the scheduler in the NPU controller 130 may acquire the memory address value of the feature map of the layer of the artificial neural network model and the weight data which are stored in the memory. Accordingly, the scheduler in the NPU controller 130 may acquire feature map of a layer and weight data of an artificial neural network model to be driven from the main memory, to store the acquired data in the NPU internal memory 120.

Feature map of each layer may have a corresponding memory address value.

Each of the weight data may have a corresponding memory address value.

The scheduler in the NPU controller 130 may be provided with scheduling information to sequence operations of the plurality of processing elements 110 based on information about data locality information or structure of the neural network model, such as batch data, locality information, or structure of layers of the neural network in the neural network model. The scheduling information may be generated in a compilation step.

The scheduler in the NPU controller 130 may schedule an operation order of the plurality of processing elements 110 based on the data locality information or the information about the structure of the artificial neural network model, for example, the layout information of layers of the artificial neural network or the information about the structure of the artificial neural network model.

Since the scheduler in the NPU controller 130 operates based on scheduling information based on information about the data locality or structure of the neural network model, it may operate differently from the scheduling concept of a typical CPU. The scheduling of the normal CPU operates to provide the highest efficiency in consideration of fairness, efficiency, stability, and reaction time. That is, the normal CPU schedules to perform the most processing during the same time in consideration of a priority, an operation time and the like.

A conventional CPU uses an algorithm which schedules a task in consideration of data such as a priority or an operation processing time of each processing.

In contrast, the scheduler in the NPU controller 130 may control the neural processing unit 100 according to a determined processing order of the neural processing unit 100 based on the data locality information or the information about the structure of the artificial neural network model.

Moreover, the scheduler in the NPU controller 130 may operate the neural processing unit 100 according to the determined the processing order based on the data locality information or the information about the structure of the artificial neural network model and/or data locality information or information about a structure of the neural processing unit 100 to be used.

However, the present disclosure is not limited to the data locality information or the information about the structure of the neural processing unit 100.

The scheduler in the NPU controller 130 may be configured to store the data locality information or the information about the structure of the artificial neural network.

That is, even though only the data locality information or the information about the structure of the artificial neural network of the artificial neural network model is utilized, the scheduler in the NPU controller 130 may determine a processing sequence.

Moreover, the scheduler in NPU controller 130 may determine the processing order of the neural processing unit 100 by considering the data locality information or the information about the structure of the artificial neural network model and data locality information or information about a structure of the neural processing unit 100. Furthermore, it is possible to optimize the processing according to the determined processing order.

That is, the NPU controller 130 may be configured to operate based on machine code compiled by a compiler, but in another example, the NPU controller 130 may be configured to embed an embedded compiler. According to the above-described configuration, the neural processing unit 100 may be configured to receive a file in the form of a framework of various AI software and generate machine code. For example, AI software frameworks may include TensorFlow, PyTorch, Keras, XGBoost, mxnet, DARKNET, ONNX, and the like.

The plurality of processing elements 110 refers to a configuration in which a plurality of processing elements PE1 to PE12 that is configured to operate feature map and weight data of the artificial neural network is deployed. Each processing element may include a multiply and accumulate (MAC) operator and/or an arithmetic logic unit (ALU) operator, but the examples according to the present disclosure are not limited thereto.

Each processing element may further include an additional special function unit for processing the additional special functions.

For example, it is also possible for the processing element PE to be modified and implemented to further include a batch-normalization unit, an activation function unit, an interpolation unit, and the like.

The SFU 150 may include each processing circuit configured to select and process activation function operation, pooling operation, stride operation, batch-normalization operation, skip-connection operation, concatenation operation, quantization operation, clipping operation, padding operation, and the like according to the architecture of the artificial neural network. That is, the SFU 150 may include a plurality of special function arithmetic processing circuit units.

Even though FIG. 3 illustrates a plurality of processing elements as an example, operators implemented by a plurality of multiplier and adder trees may also be configured to be deployed in parallel in one processing element, instead of the MAC. In this case, the plurality of processing elements 110 may also be referred to as at least one processing element including a plurality of operators.

The plurality of processing elements 110 is configured to include a plurality of processing elements PE1 to PE12. The plurality of processing elements PE1 to PE12 of FIG. 3 is merely an example for the convenience of description and the number of the plurality of processing elements PE1 to PE12 is not limited to 12 or any other integer numbers. A size or the number of processing element arrays 110 may be determined by the number of the plurality of processing elements PE1 to PE12. The size of the plurality of processing elements 110 may be implemented by an N×M matrix. Here, N and M are integers greater than zero. The plurality of processing elements 110 may include N×M processing elements. That is, one or more processing elements may be provided.

A number of the plurality of processing elements 110 may be designed in consideration of the characteristic of the artificial neural network model in which the neural processing unit 100 operates.

The plurality of processing elements 110 is configured to perform a function such as addition, multiplication, and accumulation required for the artificial neural network operation. In other words, the plurality of processing elements 110 may be configured to perform a multiplication and accumulation (MAC) operation.

Hereinafter, a first processing element PE1 among the plurality of processing elements 110 will be explained with an example.

Figure 4A:
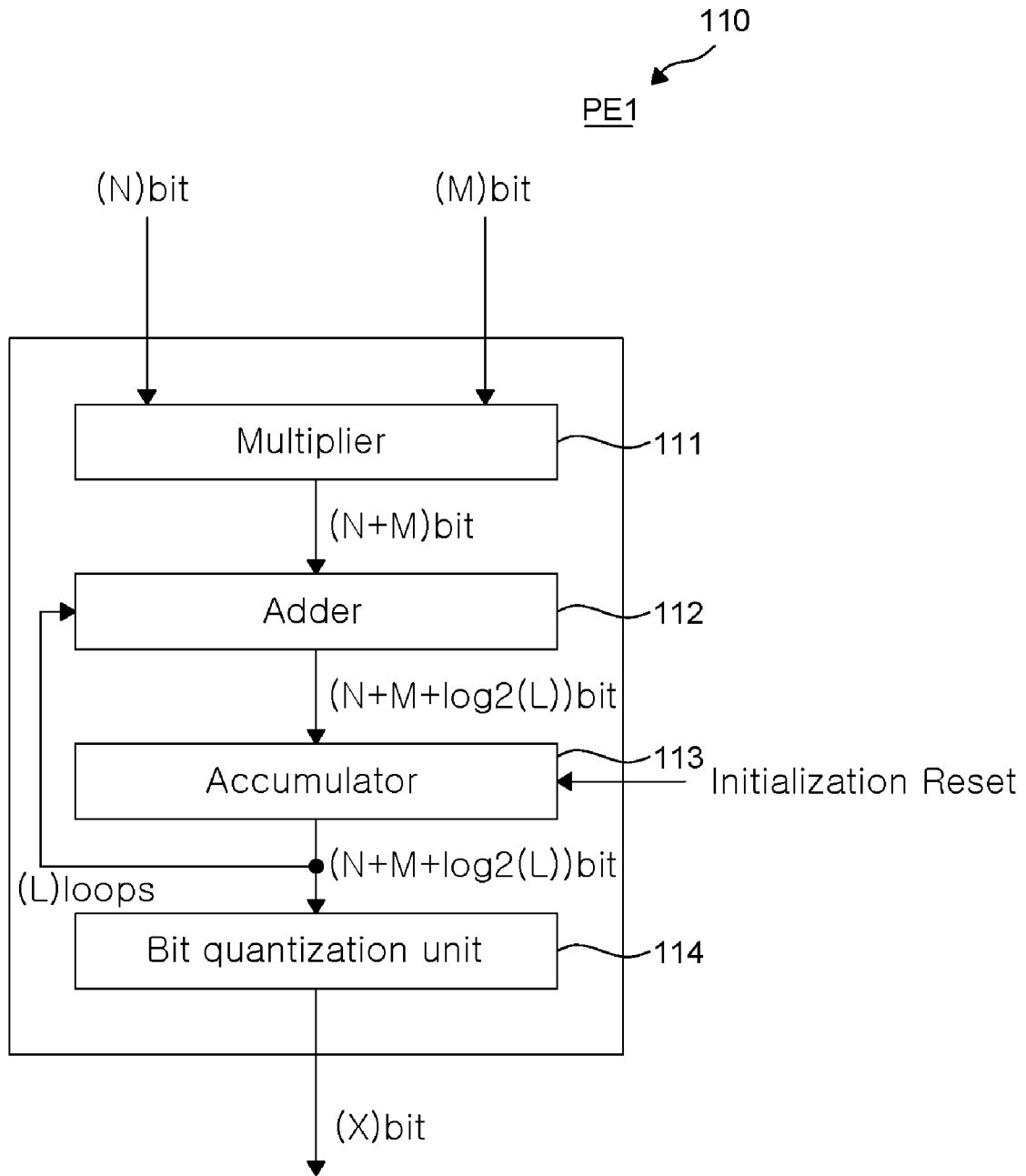
FIG. 4A is a schematic conceptual diagram illustrating one processing element among a plurality of processing elements that may be applied to an example of the present disclosure.

FIG. 4A illustrates one processing element among a plurality of processing elements that may be applied to an example of the present disclosure.

As illustrated in FIG. 3, the neural processing unit 100 according to the examples of the present disclosure may include the plurality of processing elements 110, the NPU internal memory 120 configured to store an artificial neural network model inferred from the plurality of processing elements 110, and the NPU controller 130 configured to control the plurality of processing elements 110 and the NPU internal memory 120 based on data locality information or information about a structure of the artificial neural network model. The plurality of processing elements 110 is configured to perform the MAC operation and the plurality of processing elements 110 is configured to quantize and output the MAC operation result, but the examples of the present disclosure are not limited thereto.

The NPU internal memory 120 may store all or a part of the artificial neural network model in accordance with the memory size and the data size of the artificial neural network model.

As illustrated in FIG. 4A, the first processing element PE1 may include a multiplier 111, an adder 112, an accumulator 113, and a bit quantizer 114. However, the examples according to the present disclosure are not limited thereto and the plurality of processing elements 110 may be modified in consideration of the operation characteristic of the artificial neural network.

The multiplier 111 multiplies input (N) bit data and (M) bit data. The operation value of the multiplier 111 is output as (N+M) bit data.

The multiplier 111 may be configured to receive one variable and one constant.

The accumulator 113 accumulates an operation value of the multiplier 111 and an operation value of the accumulator 113 using the adder 112 as many times as the number of (L) loops. Therefore, a bit width of data of an output unit and an input unit of the accumulator 113 may be output to (N+M+log 2(L)) bits. Here, L is an integer greater than zero.

When the accumulation is completed, the accumulator 113 is applied with an initialization reset to initialize the data stored in the accumulator 113 to zero, but the examples according to the present disclosure are not limited thereto.

The bit quantizer 114 may reduce the bit width of the data output from the accumulator 113. The bit quantizer 114 may be controlled by the NPU controller 130. The bit width of the quantized data may be output to (X) bits. Here, X is an integer greater than zero. According to the above-described configuration, the plurality of processing elements 110 is configured to perform the MAC operation and the plurality of processing elements 110 may quantize the MAC operation result to output the result. The quantization may have an effect that the larger the (L) loops, the smaller the power consumption. Further, when the power consumption is reduced, the heat generation may also be reduced. Additionally, when the heat generation is reduced, the possibility of the erroneous operation of the neural processing unit 100 due to the high temperature may be reduced.

Output data (X) bits of the bit quantizer 114 may serve as node data of a subsequent layer or input data of a convolution. When the artificial neural network model is quantized, the bit quantizer 114 may be configured to be supplied with quantized information from the artificial neural network model. However, it is not limited thereto and the NPU controller 130 may also be configured to extract quantized information by analyzing the artificial neural network model. Accordingly, the output data (X) bit is converted to a quantized bit width to be output so as to correspond to the quantized data size. The output data (X) bit of the bit quantizer 114 may be stored in the NPU internal memory 120 with a quantized bit width.

The plurality of processing elements 110 of the neural processing unit 100 according to an example of the present disclosure may include a multiplier 111, an adder 112, and an accumulator 113. The bit quantizer 114 may be selected according to whether quantization is applied or not. In another example, the bit quantization unit may also be configured to be included in the SFU 150.

Figure 4B:
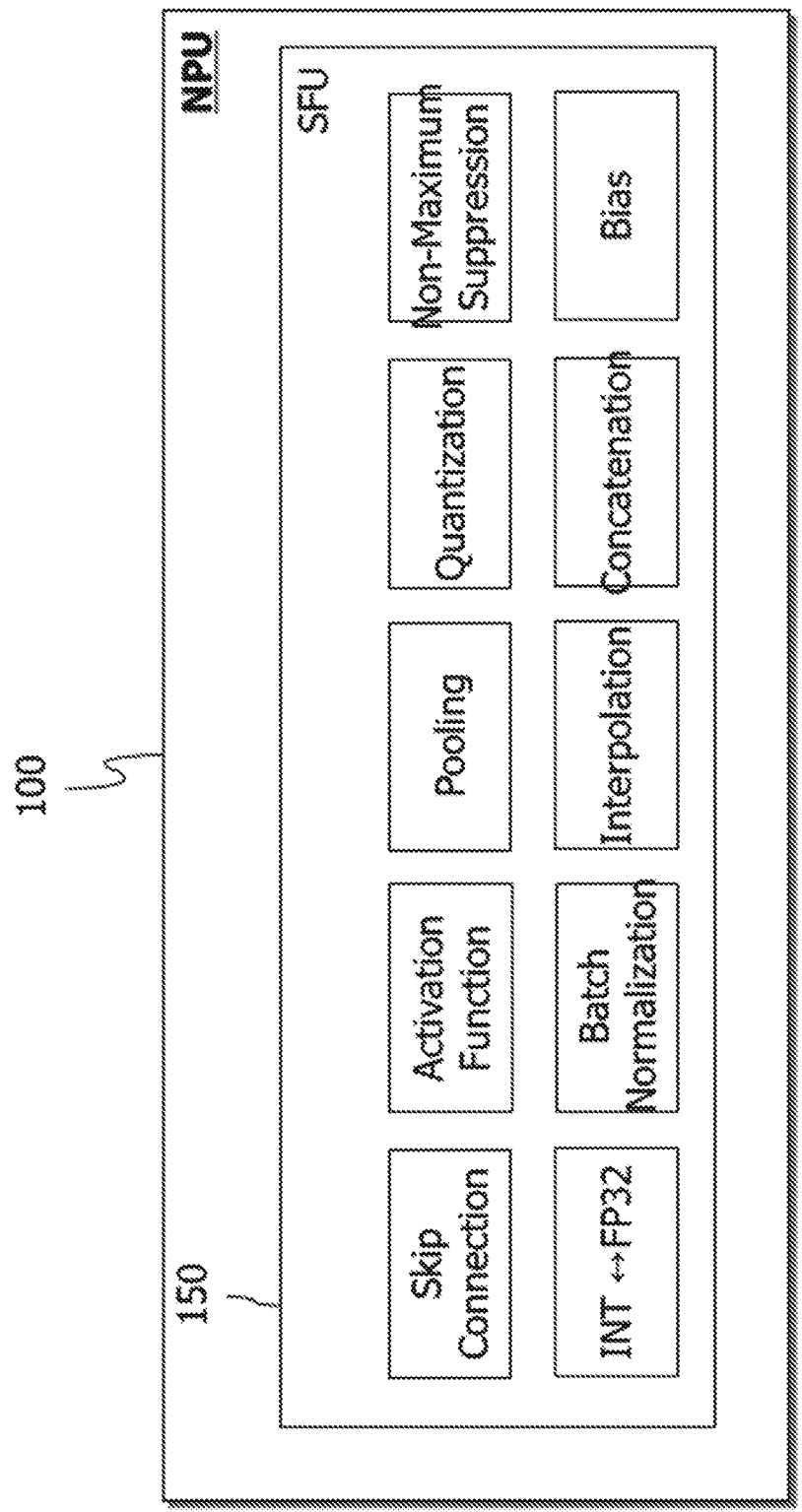
FIG. 4B is a schematic conceptual diagram illustrating an SFU that can be applied to an example of the present disclosure.

FIG. 4B is a schematic conceptual diagram illustrating an SFU that can be applied to an example of the present disclosure.

Referring to FIG. 4B, the SFU 150 may include several functional units. Each functional unit can be operated selectively. Each functional unit can be selectively turned on or turned off. That is, each functional unit can be set.

In other words, the SFU 150 may include various circuit units required for an artificial neural network inference operation.

For example, the circuit units of the SFU 150 may include a functional unit for skip-connection operation, a functional unit for activation function operation, a functional unit for pooling operation, a functional unit for quantization operation, a functional unit for non-maximum suppression (NMS) operation, a functional unit for integer to floating point conversion (INT to FP32) operation, a functional unit for a batch-normalization operation, a functional unit for an interpolation operation, a functional unit for a concatenation operation, a functional unit for a bias operation, and the like.

Functional units of the SFU 150 may be selectively turned on or off according to the data locality information of the artificial neural network model. Data locality information of an artificial neural network model may include turn-off of a corresponding functional unit or control information related to turn-off when an operation for a specific layer is performed.

An activated unit among functional units of the SFU 150 may be turned on. In this way, when some functional units of the SFU 150 are selectively turned off, power consumption of the neural processing unit 100 can be reduced. Meanwhile, in order to turn off some functional units, power gating may be used. Alternatively, clock gating may be performed to turn off some functional units.

Figure 5:
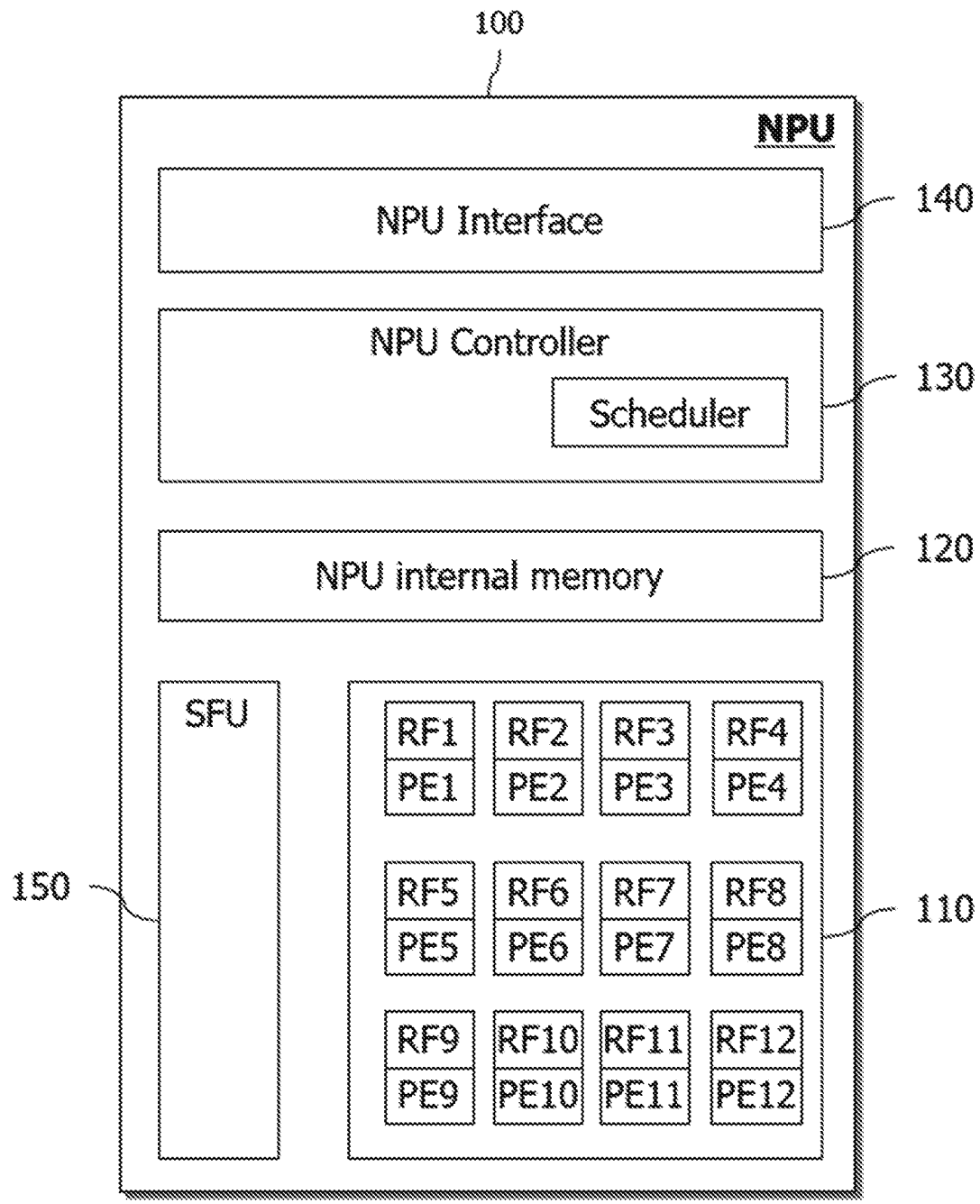
FIG. 5 is an exemplary diagram illustrating a modified example of the neural processing unit 100 shown in FIG. 3.

FIG. 5 illustrates a modified example of the neural processing unit 100 of FIG. 3.

The neural processing unit 100 of FIG. 5 is substantially the same as the neural processing unit 100 exemplarily illustrated in FIG. 3, except for the shown addition of the plurality of processing elements 110. Thus, redundant description will be omitted for the brevity.

The plurality of processing elements 110 exemplarily illustrated in FIG. 5 may further include register files RF1 to RF12, each of which corresponds to processing elements PE1 to PE12 respectively, in addition to a plurality of processing elements PE1 to PE12.

The plurality of processing elements PE1 to PE12 and the plurality of register files RF1 to RF12 of FIG. 5 are merely an example for the convenience of description and the number of the plurality of processing elements PE1 to PE12 and the plurality of register files RF1 to RF12 is not limited to 12 or any other integer number.

A size of, or the number of, processing element arrays 110 may be determined by the number of the plurality of processing elements PE1 to PE12 and the plurality of register files RF1 to RF12. The size of the plurality of processing elements 110 and the plurality of register files RF1 to RF12 may be implemented by an N×M matrix. Here, N and M are integers greater than zero.

An array size of the plurality of processing elements 110 may be designed in consideration of the characteristic of the artificial neural network model in which the neural processing unit 100 operates. For additional explanation, the memory size of the register file may be determined in consideration of a data size, a required operating speed, and a required power consumption of the artificial neural network model to operate.

The register files RF1 to RF12 of the neural processing unit 100 are static memory units which are directly connected to the processing elements PE1 to PE12. For example, the register files RF1 to RF12 may be configured by flip-flops and/or latches. The register files RF1 to RF12 may be configured to store the MAC operation value of the corresponding processing elements PE1 to PE12. The register files RF1 to RF12 may be configured to provide or be provided with the weight data and/or node data to or from the NPU internal memory 120.

It is also possible that the register files RF1 to RF12 are configured to perform a function of a temporary memory of the accumulator during MAC operation.

<Technical Difficulties Found by the Inventors of the Present Disclosure>

Depending on the purpose of the artificial intelligence service, several types of artificial neural network (ANN) models may exist. For example, when input data is an image or video, a CNN type artificial neural network model for object classification, object detection, object tracking, and the like in an image/video may be used for artificial intelligence service.

In general, an artificial neural network model may have a different amount of computation for each layer. This will be described with reference to FIGS. 6A and 6B.

Figure 6A:
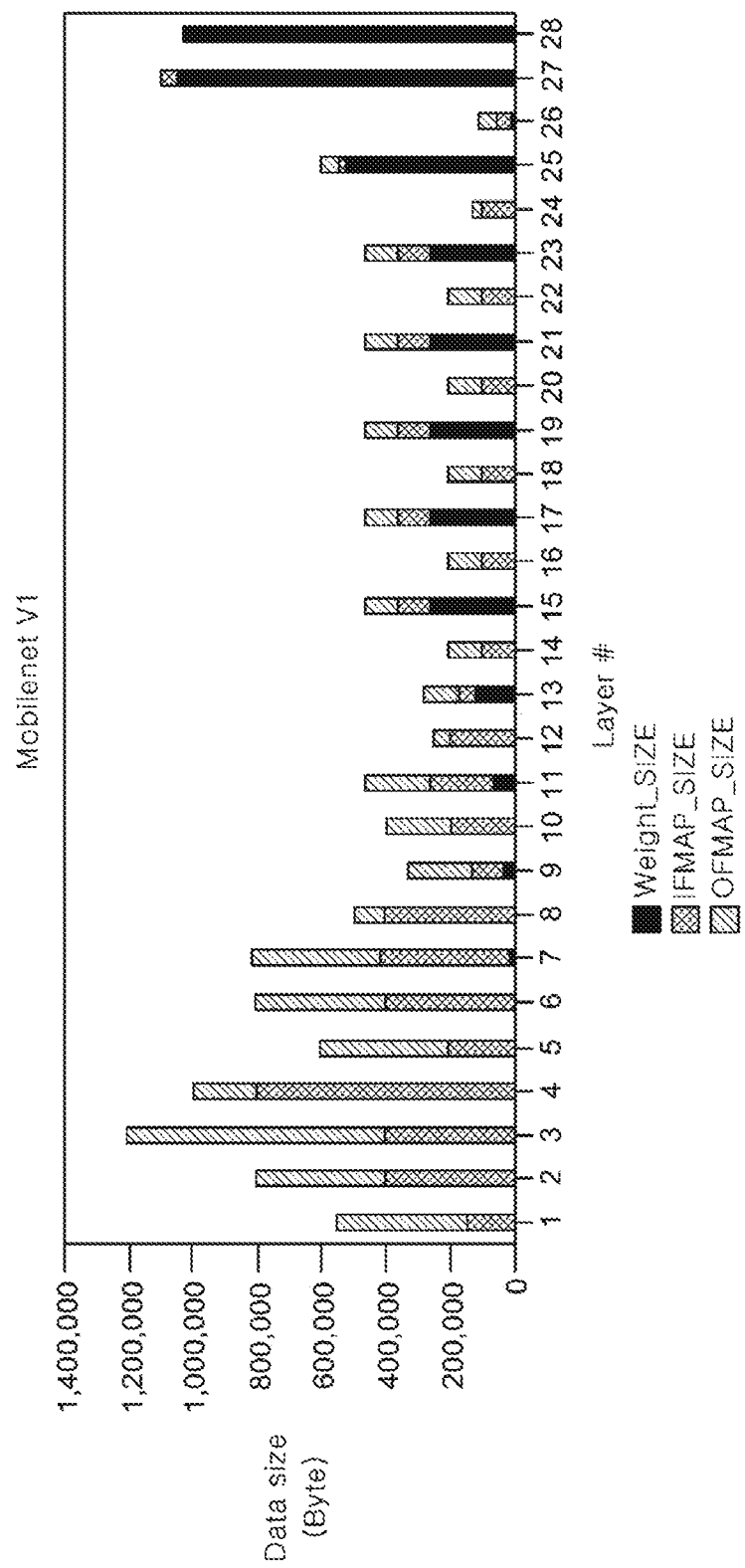
FIG. 6A is an exemplary view showing the size of data for each layer in the exemplary artificial neural network model.

FIG. 6A is an exemplary view showing the size of data for each layer in the exemplary artificial neural network model, and FIG. 6B is an exemplary table showing the size of data for each layer in the exemplary artificial neural network model shown in FIG. 6A.

The exemplary artificial neural network model shown in FIG. 6A is shown to be Mobilenet V 1. The horizontal axis shown in FIG. 6A represents layers sequentially in the exemplary artificial neural network model, and the vertical axis represents the size of data.

Referring to layer 1 shown in FIG. 6A, it can be seen that the size of the output feature map OFMAP_SIZE is greater than the size of the input feature map IFMAP_SIZE.

The output feature map of the first layer is transferred to the second layer and becomes the input feature map of the second layer. When the calculation of the second layer is completed, an output feature map is output. The output feature map of the second layer is transferred to the third layer again, and becomes the input feature map of the third layer.

As such, the size of input data input to each layer and the size of an output feature map output from each layer may be different. Accordingly, the amount of calculation may be small in a certain layer, but the amount of calculation may be very large in another layer. In this way, as the amount of computation per layer is greatly fluctuated, a problem of managing power stability may occur.

Each layer may be divided into a plurality of computational steps and processed according to the number of processing elements in the neural processing unit and the capacity limitations of the NPU internal memory 120. Accordingly, the neural processing unit 100 may divide each layer into a plurality of tiles and schedule the plurality of computation steps to be processed. The scheduling may be performed by the compiler. For example, a layer may be divided into four tiles. Each tile may be processed sequentially by a neural processing unit. The compiled neural network model can store the computation order information determined when it is compiled in the scheduler. At this time, PE utilization rate information may be provided for each computation step.

The amount of computation of each layer can be known by MAC. It can be seen that the amount of computation for each layer differs by a maximum of 227 times.

The neural processing unit 100 may determine the number of operating processing elements among the plurality of processing elements 110 in proportion to the MAC operation amount for each operation step of a layer. In addition, power consumption may increase in proportion to the number of operating processing elements.

Thus, the PE utilization rate may be calculated for each computation step of each layer of the artificial neural network model processed by the neural processing unit 100. Furthermore, the PE utilization rate for each computational step may be accurately predicted repeatedly, unless the structure of the neural network model processed by the neural processing unit 100 changes. That is, the neural processing unit 100 may repeatedly infer a particular neural network model. In such a case, the inventors of the present disclosure recognize that the neural processing unit 100 may repeatedly use the same weight parameters and the same network layer structure.

Also, the greater the difference in MAC computation between neighboring layers, the greater the variation in peak power between neighboring layers. In addition, as the difference in MAC computation amount between adjacent layers increases, the deviation of peak power between adjacent layers may increase. Also, the larger the deviation of the peak power, the more the supply voltage VDD (e.g., a driving voltage) may fluctuate.

In particular, the inventors of the present disclosure have recognized that when the amount of calculations greatly increases in a specific computation step of a specific layer, peak power consumption increases, thereby deteriorating system stability.

For example, many processing elements may be operated at the same time for the operation of a specific computation step of a specific layer. A certain amount of power is required to drive each processing element, and when a considerable number of processing elements are simultaneously driven, the required power may rapidly increase. If the neural processing unit is designed specifically for low-power operation, the power supply capability may be relatively less than that of the neural processing unit for a server. Accordingly, such a neural processing unit for an edge device may be relatively more vulnerable to an instantaneous power supply issue, and a supply voltage VDD may fluctuate when the power supply amount increases exponentially. Thus, data stored in the transistor may be lost, especially if the supply voltage VDD drops below the threshold voltage of the transistor. In other words, when the supply voltage VDD is lowered, setup/hold violation problems may occur in the neural processing unit, resulting in malfunction. In particular, this phenomenon can become more severe as the semiconductor foundry's process becomes lower, such as 3 nm, 4 nm, 5 nm, and 7 nm.

For another example, the inventors of the present disclosure have recognized that since the plurality of PEs 110 that perform operations for an artificial neural network, for example, add, multiply, and accumulate instantaneously consume a lot of power, sufficient power may not be supplied to other components in the NPU, for example, the internal memory 120. Specifically, the inventors of the present disclosure have recognized that there may be a problem that cannot be ruled out that, if sufficient power is not supplied to the internal memory 120, the possibility of compromising stored data bits may occur.

Furthermore, the inventors of the present disclosure have recognized that when the utilization rate of PEs is low in a particular computational step, the voltage stability of the neural processing unit can be ensured even if the drive frequency of the neural processing unit is increased.

<Disclosures of the Present Disclosure>

As described above, the inventors of the present disclosure have recognized that the computational amount of the artificial neural network model processed by the neural processing unit varies rapidly from layer to layer, which can cause the power (W) to vary significantly, resulting in a decrease in system stability.

While the design of neural processing units has traditionally focused on reducing the average power consumption, the inventors of the present disclosure have recognized that it is more important to reduce the power of specific computational stages, i.e., to stabilize the supply voltage VDD by regulating the power of specific computational stages.

Therefore, the inventors of the present disclosure have invented a technique to reduce the variation in the power of each computation step, even if the amount of computation varies rapidly among the computation steps of the layers of the ANN model.

Referring to the following drawings, various examples of the techniques invented by the inventors of the present disclosure will be described.

Figure 7A:
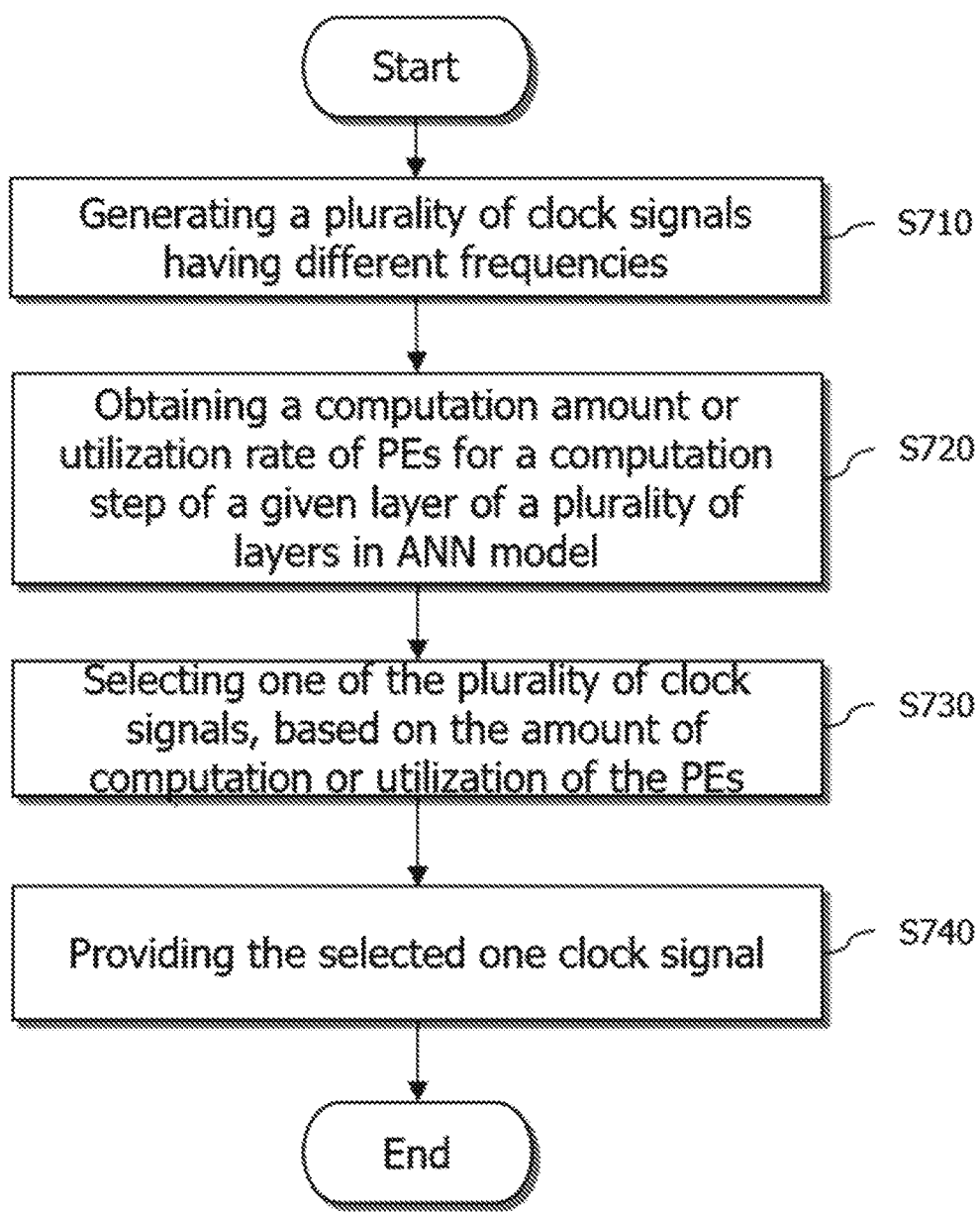
FIG. 7A is an exemplary diagram briefly illustrating a technique presented in an example of the present disclosure.

FIG. 7A is an illustrative diagram outlining a technique presented in one example of the present disclosure.

Figure 7B:
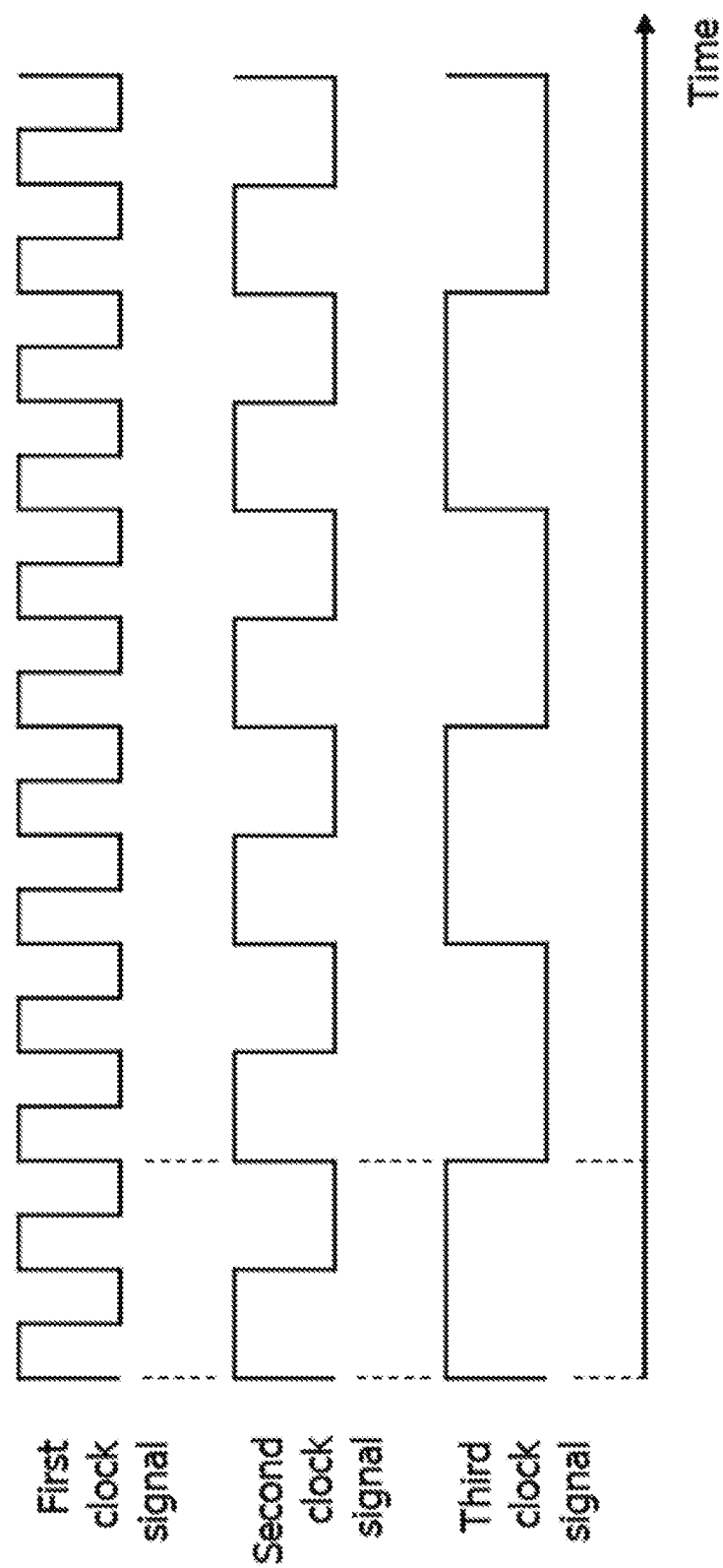
FIG. 7B is an exemplary diagram illustrating an example of a clock signal used in a technique presented in an example of the present disclosure.

FIG. 7B is an illustrative diagram depicting an example of a clock signal used in the techniques presented in one example of the present disclosure.

Referring to FIG. 7A, according to an example of the present disclosure, a plurality of clock signals having different frequencies may be generated S710.

For example, the plurality of clock signals having different frequencies may be generated simultaneously. For example, the plurality of clock signals having different frequencies may be generated sequentially. For example, the plurality of clock signals having different frequencies may be generated simultaneously and/or sequentially.

For example, one clock signal of the plurality of clock signals having different frequencies may be selected and provided. Among the plurality of clock signals having different frequencies, a plurality of clock signals may be selected and provided simultaneously.

For example, the plurality of clock signals may be a first clock signal, a second clock signal, and a third clock signal as shown in FIG. 7B. As shown in FIG. 7B, the first clock signal may have a higher frequency than the second clock signal. As shown in FIG. 7B, the second clock signal may have a higher frequency than the third clock signal.

A higher frequency means that the signal changes at a higher rate within the same time interval. Conversely, the second clock signal may have a lower frequency than the first clock signal. The third clock signal may have a lower frequency than the second clock signal.

For example, the first clock signal may be 1.2 GHz. However, examples of the present disclosure are not limited thereto. For example, the second clock signal may be 1.0 GHz. However, examples of the present disclosure are not limited thereto. For example, the third clock signal may be 800 MHz. However, examples of the present disclosure are not limited thereto.

For example, the first clock signal may be 1.2 GHz. However, examples of the present disclosure are not limited thereto. For example, the second clock signal may be 1.1 GHz. However, examples of the present disclosure are not limited thereto. For example, the third clock signal may be 1.0 MHz. However, examples of the present disclosure are not limited thereto.

For example, the first clock signal may have a frequency of twice the frequency of the second clock signal. However, examples of the present disclosure are not limited thereto. For example, the second clock signal may have a frequency of twice the frequency of the third clock signal. However, examples of the present disclosure are not limited thereto.

Further, a computation amount or utilization rate of PEs for a computation step of a given layer of a plurality of layers in an artificial neural network (ANN) model processed by a neural processing unit (NPU) may be obtained S720.

The utilization rate of PEs refers to the ratio of operating PEs to the number of PEs. For example, if the number of PEs is 1000 and the number of PEs utilized for the corresponding operation step is 700, the utilization rate may be 70%. The utilization rate of PEs may vary depending on the operation stage. That is, the utilization rate of PEs at each operation stage can be profiled for at least one artificial neural network model. For example, an average of the utilization rates of PEs of a plurality of adjacent operation stages over a certain period of time may be calculated.

The plurality of PEs may also be referred to as NPU cores, NPU engines, NPU threads, and the like. The NPU cores, NPU engines, NPU threads, and the like may be semiconductor circuits with numerous transistors connected thereto. As such, some of them may be difficult to identify and distinguish with the naked eye, and may be identified only by operation thereof.

The neural processing unit may be configured to include a plurality of NPU cores, NPU engines, and NPU threads.

The plurality of PEs may include an adder, a multiplier, and an accumulator.

Based on the amount of computation or utilization of the PEs, one of the plurality of clock signals may then be selected S730 and supplied S740.

The one clock signal may be selected with further consideration of a threshold for the amount of computation or utilization rate of the PEs, i.e., the frequency of the one clock signal may be selected based on a threshold for the amount of computation or utilization rate of the PEs. In order to reduce the fluctuation of the supply voltage VDD when performing operations in the computation stage of the given layer, a threshold value for the amount of computation or the utilization rate of the PEs for the computation stage of the given layer may be determined.

The utilization rate of PEs at each operation step can be calculated based on the size of the parameter and the MAC operation amount corresponding to the operation step of each layer of the artificial neural network model processed by the neural processing unit. For example, if the parameter size of the input feature map of the calculation step of a specific layer is large, and the size of the kernel and the number of channels in the kernel are large, the utilization rate of PEs corresponding to the calculation step of the corresponding layer may be high.

The characteristics of each layer of the artificial neural network model may include the shape of an input feature map (IF) and/or weight. The shape of the input feature map (IF) and/or weight may be determined by height, width, depth, and channels.

The input feature map of an artificial neural network can be divided into a plurality of small tiles, and each tile can extract features through operations with a kernel. Systolic array structures that can minimize MAC calculation time for each tile may be different.

In a convolutional neural network, most of the computation time is taken up by the convolution operation. The number of MAC operations for the convolution operation can be calculated using the algorithm shown in Equation 1 below.

[Equation 1]

```
for (m=0; m<M; m++)              // Num filters
   for (e=0; e<E; e++)           // num_conv_window(height)
      for (f=0; f<F; f++)        // num_conv_window(width)
         for (c=0; c<C; c++)     // Elements per filter(channel)
            for (r=0; r<R; r++)  // Elements per filter(height)
               for (s=0; s<S; s++) // Elements per filter(width)
               {
                  output[m][e][f] = input[c][e+r][f+s] * weight[m][c][r][s]
                  time = time + 1;
               }
```

M is the number of filters, E is the height of the output feature map, F is the width of the output feature map, C is the number of channels, R is the height of the filter, and S is a constant representing the width of the filter.

Referring to Equation 1, the followings are variables that m is the number of filters, e is the height of the output feature map, f is the width of the output feature map, c is the number of channels, r is the height of the filter, and s is the width of the filter. In addition, the followings are constants that M is the number of filters, E is the height of the output feature map, F is the width of the output feature map, C is the number of channels, R is the height of the filter, and S is the width of the filter.

The algorithm according to Equation 1 can compute different for-loops in parallel for each stationary technique. In the case of a systolic array structure according to the output stationary mode, the algorithm according to Equation 1 may perform loop-unrolling of the first to third for-loops. Specifically, in the case of a systolic array structure according to the output stationary mode, the first for-loop (Num filters) can be executed in parallel by the number of rows of the processing element array, and the second for-loop (num_conv_window(height)) and the third for-loop (num_conv_window(width)) can be executed in parallel by the number of columns of the processing element array.

The neural processing unit according to one example of the present disclosure may calculate the total MAC computation time using a particular number of processing elements, particular input feature maps and/or particular weights, given that a MAC computation with an input feature map and one kernel as input is referred to as one cycle. Thus, the utilization rate of the PE may be calculated. The PE utilization rate profiling may be performed during the compilation phase or runtime of the neural network model.

For example, as shown in Table 1 below, when the PE utilization rate of a specific operation stage of a specific layer exceeds a threshold of 90%, a second clock signal may be provided.

TABLE 1

| Thresholds for PE Utilization | Clock Signal |
| --- | --- |
| 50% | The First Clock Signal |
| 70% | The Second Clock Signal |
| 90% | The Third Clock Signal |

When the neural processing unit completes an operation for an operation step (i.e., calculation step) of a layer preceding the operation step of the given layer of the at least one ANN model, the one clock signal may be selected. That is, a clock signal with the optimal frequency considering the PE utilization rate of the next calculation step can be selected. The frequency of the clock signal may be a frequency selected in consideration of the power of a specific operation step. Additionally, the frequency of the clock signal may be selected in consideration of the stability of the supply voltage VDD.

The neural processing unit 100 may obtain the computation amount (i.e., calculation amount) of the next computation step (i.e., calculation step) or the utilization rate of the plurality of PEs in advance based on the computation step information of the artificial neural network model stored in the scheduler of the NPU controller 130.

If the amount of computation or the utilization rate of the PEs for the computation step of the given layer is higher than the computation step of the previous layer, the one clock signal selected for the computation step of the given layer may have a second frequency lower than the first frequency of the computation step of the previous layer.

For example, if the clock signal for the computation step of the previous layer was the first clock signal shown in FIG. 7B, the clock signal selected for the computation step of the given layer may be the second clock signal shown in FIG. 7B.

If the amount of computation or the utilization rate of the PEs for the computation step of the given layer is lower than the computation step of the previous layer, the one clock signal selected for the computation step of the given layer may have a second frequency higher than the first frequency of the computation step of the previous layer.

For example, if the clock signal for the computation step of the previous layer was the second clock signal shown in FIG. 7B, the clock signal selected for the computation step of the given layer may be the first clock signal shown in FIG. 7B.

The amount of computation or utilization rate of the PEs for a computational step of the given layer may be determined for each of the computational steps of the plurality of layers of the at least one ANN model.

The amount of computation for a computational step of a given layer or the utilization rate of the PEs may be determined based on scheduling information used to allocate computation for a computational step of each layer of the at least one ANN model to the plurality of PEs.

For example, with respect to at least one artificial neural network model, a profile of the utilization rate of PEs at each operation step (i.e., each computational step) can be used. Based on the profile and the threshold value of each operation step, the frequency of the clock signal to be applied to the plurality of PEs in the corresponding operation step may be determined. Information on each operation step of the artificial neural network model may be included in scheduling information. Therefore, profile information on the utilization rate of PEs at each operation stage can be obtained based on scheduling information.

Figure 7C:
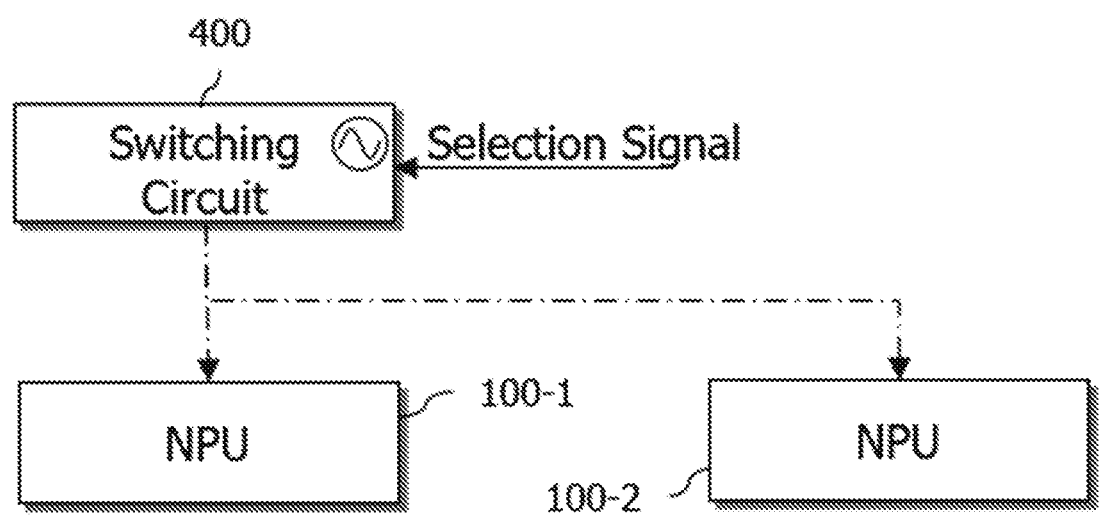
FIG. 7C is a schematic diagram briefly illustrating the hardware configuration for implementing the technique presented in an example of the present disclosure.

FIG. 7C is a schematic illustrating a hardware configuration for implementing the techniques presented in one example of the present disclosure.

Referring to FIG. 7C, a switching circuit 400 and one or more neural processing units are shown. The one or more neural processing units are exemplarily shown as two 100-1 and 100-2 in FIG. 7C.

The switching circuit 400 refers to a circuit designed to output a clock signal in a particular frequency domain. For example, the switching circuit 400 may mean a circuit designed to select and output a frequency from 600 MHz to 2.8 GHz based on a selection signal. However, one example of the present disclosure is not limited to the output frequency of the switching circuit 400.

For example, the switching circuit 400 may be a circuit including at least one of a clock source, a clock skipper circuit, a clock divider circuit, a clock gating circuit, an oscillator circuit, a phase loop lock (PLL) circuit, and a selector. For example, the switching circuit 400 may be a circuit that combines at least two of a clock source, a clock skipper circuit, a clock divider circuit, a clock gating circuit, an oscillator circuit, a PLL circuit, and a selector. The techniques for generating different frequencies with various combinations of these circuits are known in the related art and will not be described in detail below.

For example, the switching circuit 400 may be a circuit designed to generate a clock signal of at least one frequency. For example, the switching circuit 400 may be a circuit designed to receive an input of a clock signal of at least one frequency.

Accordingly, the switching circuit 400 may output clock signals of various frequencies according to the selection signal. For example, the switching circuit 400 may output a clock signal with a frequency of at least one of 1.2 GHz, 1.1 GHz, 1.0 GHz, 900 MHz, 800 MHz, depending on the selection signal. The switching circuit 400 may output a specific frequency among the preset specific frequencies according to the selection signal. However, the examples of the present disclosure are not limited to the frequency of the switching circuit 400, and the switching circuit 400 may be designed to output various frequencies.

The switching circuit 400 may be designed to output a clock signal of a particular frequency based on the selection signal. The specific frequency may be a preset frequency. Alternatively, the specific frequency may be a variable frequency in a specific band.

The selection signal may be determined based on information about the utilization rate of the PEs or the amount of MAC computation for a given computation step of any of the computation steps of the plurality of layers in the ANN model.

The plurality of PEs may include an adder, a multiplier, and an accumulator.

Information about the amount of MAC operations for a given computation step of the given layer or the utilization rate of the PEs may be included in the scheduling information. Based on the scheduling information, MAC operations for computation steps of each layer of the at least one ANN model may be assigned to the plurality of PEs.

The switching circuit 400 may select and output a clock signal of one of the plurality of clock signals based on the selection signal, that is, the switching circuit 400 may output a clock signal having a certain frequency based on the selection signal.

For example, if the amount of computation or the utilization rate of the PEs for the computation step of the given layer is higher than the computation step of the previous layer, the switching circuit 400 may select a clock signal having a second operating frequency lower than the first operating frequency of the computation step of the previous layer.

Conversely, if the amount of computation or the utilization rate of the PEs for the computation step of the given layer is lower than the computation step of the previous layer, the switching circuit 400 may select a clock signal having a second operating frequency higher than the first operating frequency of the computation step of the previous layer.

The neural processing unit 100 may obtain information on the amount of computation of all computation steps of a particular artificial neural network model or the utilization rate of a plurality of PEs. In such a case, the neural processing unit 100 may preset a clock signal with an optimal frequency for each calculation step (i.e., computation step or operation step).

The techniques presented herein can be applied with two neural processing units, or with three, four, six, or eight neural processing units. In other words, the number of neural processing units according to an example of the present disclosure is not limited.

Figure 8A:
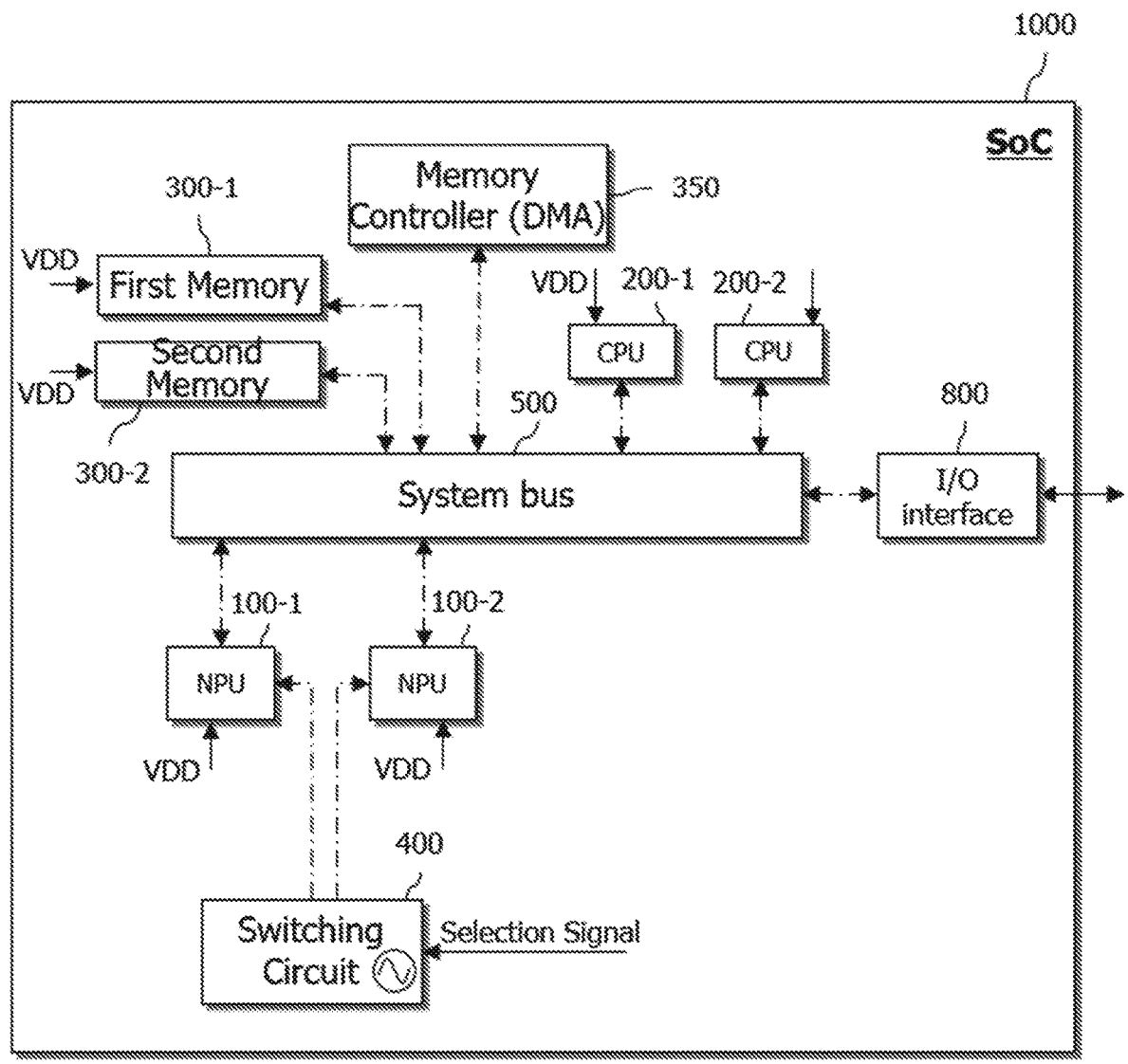
FIG. 8A is an exemplary diagram illustrating the structure of an SoC according to an example of the first disclosure of the present disclosure.

FIG. 8A is an example diagram illustrating the structure of an SoC according to the first example of the present disclosure.

Referring to FIG. 8A, an exemplary SoC 1000 may include a plurality of neural processing units, a plurality of central processing units (CPUs), and a plurality of memories. The plurality of neural processing units may include, for example, a first NPU 100-1 and a second NPU 100-2. The plurality of CPUs may include, for example, a first CPU 200-1 and a second CPU 200-2. The plurality of memories may include, for example, a first memory 300-1 and a second memory 300-2.

In FIG. 8A, the number of the plurality of neural processing units, the plurality of CPUs, and the plurality of memories is shown to be two, but the number of the plurality of neural processing units, the plurality of CPUs, and the plurality of memories can be varied, such as, but not limited to, four, six, eight, and so forth.

The exemplary SoC 1000 may include a memory controller 350, switching circuit 400, a system bus 500, and an input output (I/O) interface 800.

The system bus 500 may be implemented as an electrically conductive pattern formed on a semiconductor die. The system bus may enable high-speed communication. For example, the plurality of neural processing units, the plurality of CPUs, the plurality of memories, and the memory controller 350 may communicate with each other via the system bus 500.

The plurality of neural processing units and the plurality of CPUs may make requests to the memory controller 350 via the system bus 500, whereby the memory controller 350 may read and/or write data from at least one of the plurality of memories.

Each element (i.e., NPU, memory, and CPU) within the SoC 1000 illustrated in FIG. 8A may have a supply voltage VDD input.

While a common supply voltage VDD is illustrated in FIG. 8A, examples of the present disclosure are not limited thereto.

In some examples, each element in the SoC 1000 (i.e., NPU, memory, and CPU) may be configured to have an independent or separate supply voltage VDD input.

In other examples, some of the elements within the SoC 1000 (i.e., NPU, memory, and CPU) may be configured to have independent or separate supply voltages VDD.

In other examples, certain elements of the SoC 1000 may be configured to receive a second supply voltage that is different from the first supply voltage.

The switching circuit 400 illustrated in FIG. 8A is configured to receive a selection signal as input. Here, the selection signal may be a plurality of selection signals. Each corresponding selection signal may be input to a plurality of neural processing units (e.g., first NPU 100-1 and second NPU 100-2). The selection signals may be determined based on information about the amount of computation for a particular computational step of a particular ANN model processed by the plurality of particular neural processing units, or the utilization rate of PEs within the at least one neural processing unit.

The information may be provided by at least one of the plurality of neural processing units. Alternatively, the information may be provided by at least one of the plurality of CPUs. In this case, a selection signal corresponding to the information may be generated. The selection signal may be generated by the plurality of CPUs or the plurality of neural processing units. The generated selection signal may be communicated from at least one of the plurality of neural processing units or at least one of the plurality of CPUs to the switching circuit 400. Here, the selection signal may be communicated to the switching circuitry 400 via a system bus 500.

After generating a plurality of clock signals, the switching circuit 400 may select one clock signal from the plurality of clock signals based on the obtained information. The clock signal of the selected frequency may be delivered to the corresponding neural processing unit.

To this end, the switching circuit 400 may be a circuit including at least one of a clock source, a clock skipper circuit, a clock divider circuit, a clock gating circuit, an oscillator circuit, a phase loop lock (PLL) circuit, and a selector. The switching circuit 400 may be a circuit that combines at least two of a clock source, a clock skipper circuit, a clock divider circuit, a clock gating circuit, an oscillator circuit, a PLL circuit, and a selector. However, the examples of the present disclosure are not limited thereto.

That is, the switching circuit 400 may generate clock signals for each of the plurality of neural processing units (e.g., first NPU 100-1 and second NPU 100-2) and then deliver them to the corresponding neural processing units.

For example, the switching circuit 400 provides the first clock signal to the first NPU 100-1 and the second clock signal to the second NPU 100-2. Accordingly, the first NPU 100-1 may be operated according to the first clock signal, and the second NPU 100-2 may be operated according to the second clock signal.

For example, in a specific example, if the amount of computation or PE utilization rate for a computation step of any given layer among the computation steps of the plurality of layers in the first ANN processed by the first NPU 100-1 changes to be higher than the computation step of the previous layer, the selection signal may be instructed to lower the frequency. Accordingly, the switching circuit 400 may select a first clock signal having a frequency lower than the frequency of the computation step of the previous layer and provide it to the first NPU 100-1. Alternatively, the switching circuit 400 may modulate the frequency of the second clock signal of a second frequency to generate a first clock signal of a first frequency, and provide it to the first NPU 100-1.

Conversely, if the amount of computation or PE utilization rate for the computation step of any given layer among the computation steps of the plurality of layers in the second ANN processed by the the second NPU 100-2 changes to be lower than the computation step of the previous layer, the selection signal may be commanded to increase the frequency. Accordingly, the switching circuit 400 may select a second clock signal having a frequency higher than the frequency of the operation step of the previous layer and provide it to the second NPU 100-2. Alternatively, the switching circuit 400 may modulate the frequency of the first clock signal of a first frequency to generate a second clock signal of a second frequency, and provide it to the second NPU 100-2.

In this way, having the first NPU 100-1 and the second NPU 100-2 distributedly operate according to clock signals having different frequencies has the advantage of reducing power fluctuations between certain computational steps and improving the stability of the supply voltage.

Figure 8B:
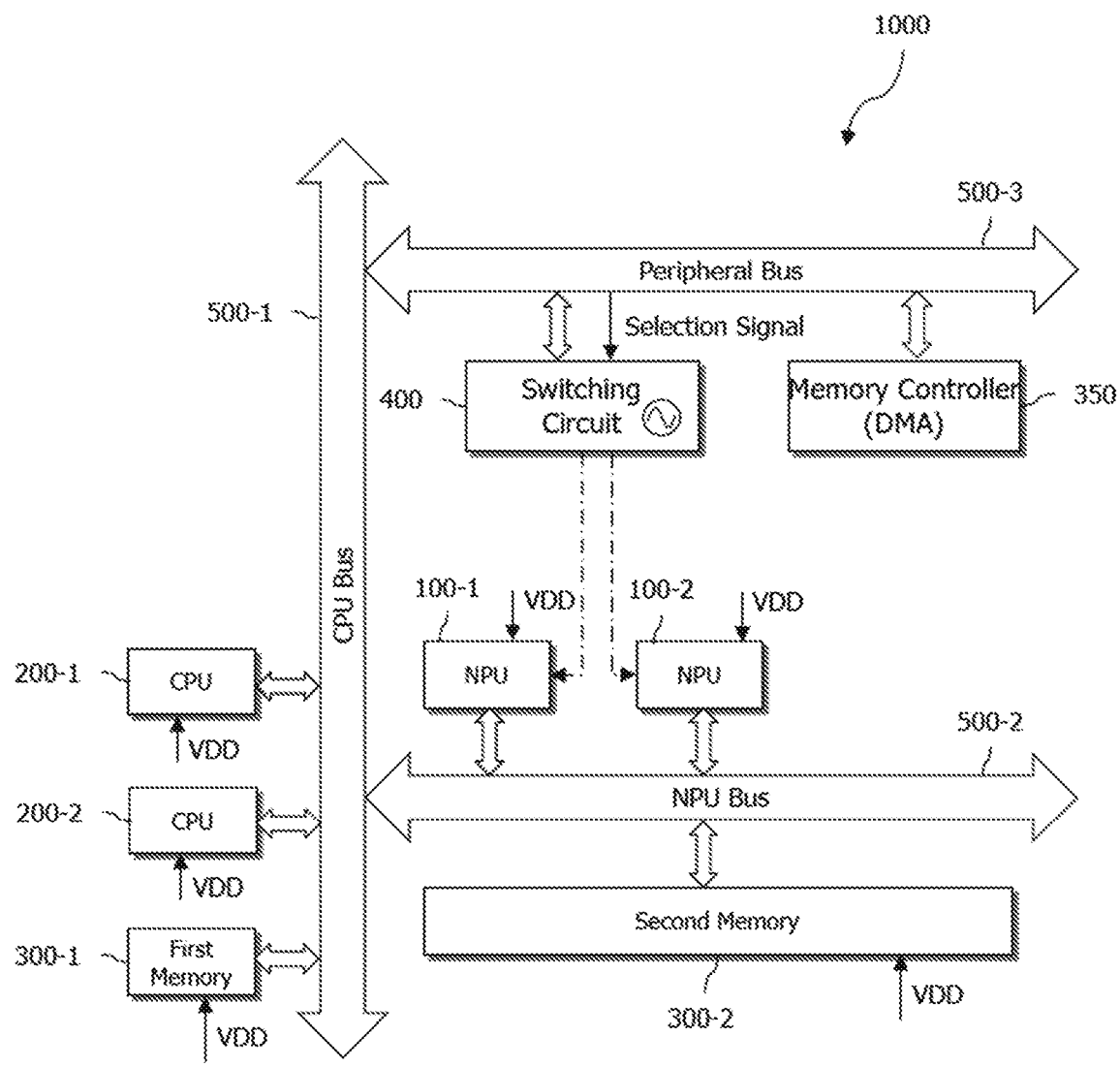
FIG. 8B is an exemplary diagram illustrating the structure of an SoC according to another example of the first disclosure of the present disclosure.

FIG. 8B is an example diagram illustrating a structure of an SoC according to second example of the present disclosure.

Referring to FIG. 8B, the exemplary SoC 1000 may include a plurality of neural processing units, a plurality of central processing units (CPUs), and a plurality of memories. The plurality of neural processing units may include, for example, a first NPU 100-1 and a second NPU 100-2. In addition, the plurality of CPUs may include, for example, a first CPU 200-1 and a second CPU 200-2. The plurality of memories may include a first memory 300-1 and a second memory 300-2.

In FIG. 8B, the number of the plurality of neural processing units, the plurality of CPUs, and the plurality of memories is shown to be two each, but the number can be varied to four, six, eight, or the like, without limitation.

The exemplary SoC 1000 may include a memory controller 350, a switching circuit 400, a plurality of buses, and an input output (I/O) interface 800.

The plurality of buses may include a bus for a CPU, such as a CPU bus 500-1, a bus for a neural processing unit, such as an NPU bus 500-2, and a bus for peripheral components, such as a peripheral bus 500-3.

The CPU bus 500-1 may be connected to the first CPU 200-1, the second CPU 200-2, and the first memory 300-1. The NPU bus 500-2 may be connected to the first NPU 100-1, the second NPU 100-2, and the second memory 300-2. The memory controller 350 and the switching circuit 400 may be connected to the peripheral bus 500-3.

A supply voltage VDD may be input to each element (i.e., NPU, memory, and CPU) in the SoC 1000 shown in FIG. 8B.

In FIG. 8B, a common supply voltage VDD is shown as being input, but examples of the present disclosure are not limited thereto.

A supply voltage VDD may be input to each element (i.e., NPU, memory, and CPU) in the SoC 1000 shown in FIG. 8B.

In some examples, it is possible to configure an independent or separate supply voltage VDD to be input to each element (i.e., NPU, memory, and CPU) within the SoC 1000.

In other examples, it is possible to configure an independent or separate supply voltage VDD to be input to some elements (i.e., NPU, memory, and CPU) within the SoC 1000.

In other examples, it is possible to configure a second supply voltage different from the first supply voltage to be input to a specific element within the SoC 1000.

The switching circuit 400 shown in FIG. 8B is configured to receive a selection signal. Here, there may be multiple selection signals. Each corresponding selection signal may be input to a plurality of neural processing units (e.g., the first NPU 100-1 and the second NPU 100-2). The selection signal may be determined based on information about the amount of computation for a specific calculation step of a specific ANN model processed by the plurality of specific neural processing units or the utilization rate of PEs in at least one neural processing unit.

The information may be provided from at least one of the plurality of neural processing units. Alternatively, the information may be provided from at least one of the plurality of CPUs. In this case, a selection signal corresponding to the information may be generated. The selection signal may be generated in the plurality of CPUs or the plurality of neural processing units. The generated selection signal may be transmitted from at least one of the plurality of neural processing units or at least one of the plurality of CPUs to the switching circuit 400. Here, the selection signal may be transmitted to the switching circuit 400 through at least one of the NPU bus 500-2, the CPU bus 500-1, and the peripheral bus 500-3.

Alternatively, the information may be provided by at least one of the plurality of CPUs. In this case, the information may be transmitted from at least one of the plurality of neural processing units and then passed to at least one of the plurality of CPUs via the NPU bus 500-2 and the CPU bus 500-1. A selection signal generated by at least one of the plurality of CPUs may be passed to the switching circuit 400 via the CPU bus 500-1 and the peripheral bus 500-3.

After generating a plurality of clock signals, the switching circuit 400 may select one clock signal among the plurality of clock signals based on the obtained information. The clock signal of the selected frequency may be transmitted to the corresponding neural processing unit.

To this end, the switching circuit 400 may be a circuit including at least one of a clock source, a clock skipper circuit, a clock divider circuit, a clock gating circuit, an oscillator circuit, a phase loop lock (PLL) circuit, and a selector. The switching circuit 400 may be a circuit that combines at least two of a clock source, a clock skipper circuit, a clock divider circuit, a clock gating circuit, an oscillator circuit, a PLL circuit, and a selector. However, the examples of the present disclosure are not limited thereto.

That is, the switching circuit 400 may generate clock signals for each of the plurality of neural processing units (e.g., the first NPU 100-1 and the second NPU 100-2) and then deliver them to the corresponding neural processing units.

For example, the switching circuit 400 provides the first clock signal to the first NPU 100-1 and the second clock signal to the second NPU 100-2. Accordingly, the first NPU 100-1 can be operated according to the first clock signal, and the second NPU 100-2 can be operated according to the second clock signal.

For example, in a specific example, if the amount of computation or PE utilization rate for a computation step of any given layer among the computation steps of the plurality of layers in the first ANN processed by the first NPU 100-1 changes to be higher than the computation step of the previous layer, the selection signal may be instructed to lower the frequency. Accordingly, the switching circuit 400 may select a first clock signal having a frequency lower than the frequency of the computation step of the previous layer and provide it to the first NPU 100-1. Alternatively, the switching circuit 400 may modulate the frequency of the second clock signal of a second frequency to generate a first clock signal of a first frequency, and provide it to the first NPU 100-1.

Conversely, if the amount of computation or PE utilization rate for the computation step of any given layer among the computation steps of the plurality of layers in the second ANN processed by the the second NPU 100-2 changes to be lower than the computation step of the previous layer, the selection signal may be commanded to increase the frequency. Accordingly, the switching circuit 400 may select a second clock signal having a frequency higher than the frequency of the operation step of the previous layer and provide it to the second NPU 100-2. Alternatively, the switching circuit 400 may modulate the frequency of the first clock signal of a first frequency to generate a second clock signal of a second frequency, and provide it to the second NPU 100-2.

In this way, the first NPU 100-1 and the second NPU 100-2 can be distributedly operated according to different clock signals, which has the advantage of reducing the power fluctuation of adjacent computational steps and improving the stability of the supply voltage.

In the above, the description is focused on SoC, but the disclosure of the present disclosure is not limited to the SoC, and the content of the present disclosure can also be applied to a SiP (System in Package) or PCB (Printed circuit board)-based board level system. For example, each functional component may be implemented as an independent semiconductor chip and connected to each other through a system bus implemented by an electrically conductive pattern formed on a PCB. Specifically, it will be described with reference to FIGS. 9A and 9B.

While the following discussion focuses on SoCs, the present disclosure is not limited to SoCs, and the teachings of the disclosure may also apply to system in package (SiP) or printed circuit board (PCB) based board level systems. For example, each functional component may be implemented as an independent semiconductor chip and connected to each other via a system bus implemented by electrically conductive patterns formed on a PCB. Specifically, this will be described with reference to FIGS. 9A and 9B.

Figure 9A:
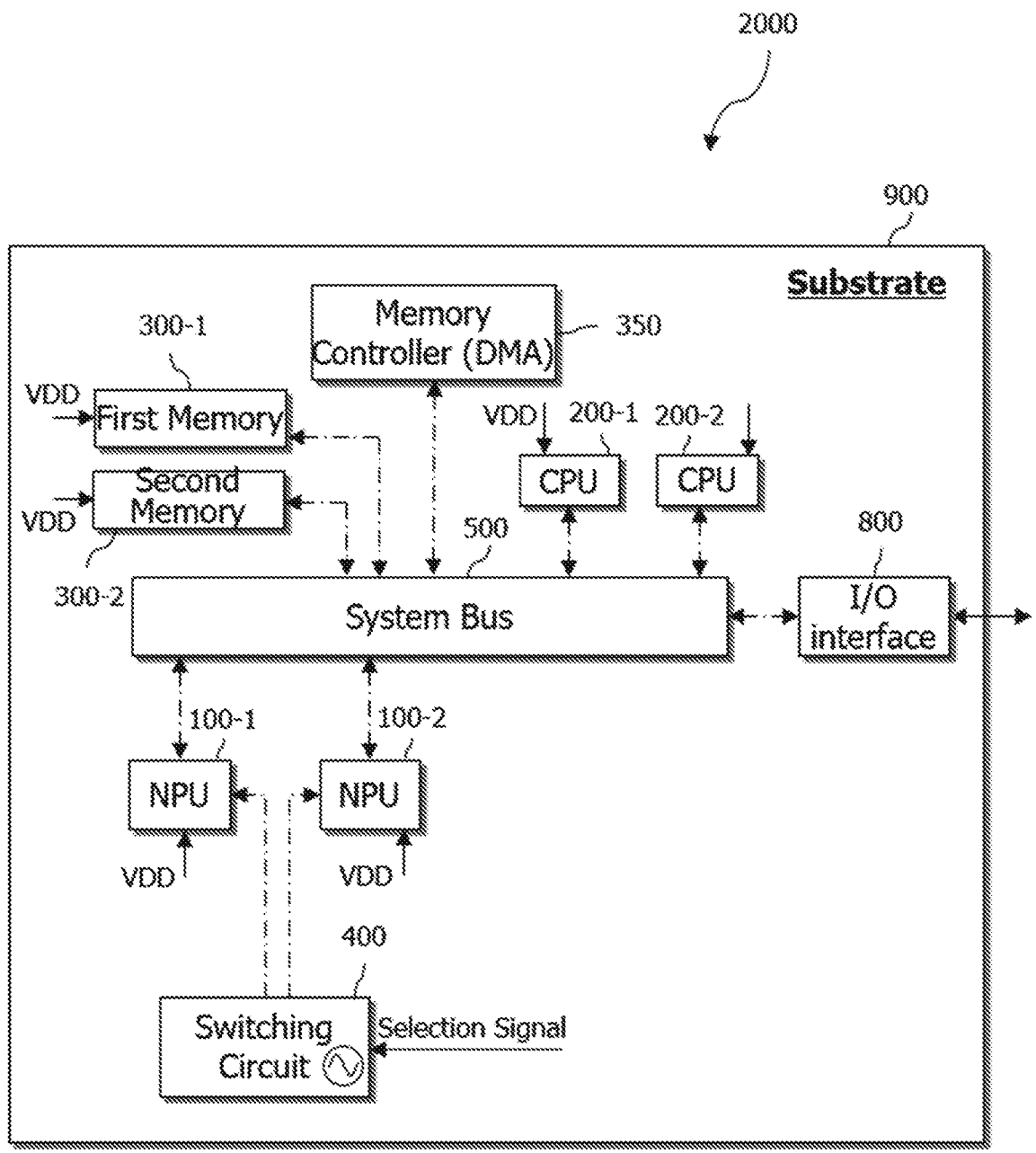
FIG. 9A is an exemplary diagram illustrating the structure of a system according to an example of the second disclosure of the present disclosure.

FIG. 9A is an example diagram illustrating the structure of a system according to the second example of the present disclosure.

Referring to FIG. 9A, an exemplary system 2000 may include a plurality of neural processing units mounted on a substrate 900, a plurality of central processing units (CPUs), and a plurality of memories. The plurality of neural processing units may include, for example, a first NPU 100-1 and a second NPU 100-2. The plurality of CPUs may include, for example, a first CPU 200-1 and a second CPU 200-2. The plurality of memories may include, for example, a first memory 300-1 and a second memory 300-2.

In FIG. 9A, the number of the plurality of neural processing units, the plurality of CPUs, and the plurality of memories is shown to be two, but the number of the plurality of neural processing units, the plurality of CPUs, and the plurality of memories can be varied to four, six, eight, or the like, without limitation.

The exemplary system 2000 may include a memory controller 350, a switching circuit 400, a system bus 500, and an input output (I/O) interface 800.

The system bus 500 may be implemented by electrically conductive patterns formed on the substrate 900. The system bus enables high-speed communication. For example, the plurality of neural processing units, the plurality of CPUs, the plurality of memories, and the memory controller 350 may communicate with each other via the system bus 500.

Each element (i.e., NPU, memory, and CPU) within the system 2000 illustrated in FIG. 9A may have a supply voltage VDD input.

In FIG. 9A, a common supply voltage VDD is shown as being input, but examples of the present disclosure are not limited thereto.

In some examples, each element in the system 2000 (i.e., NPU, memory, and CPU) may be configured to have an independent or separate supply voltage VDD input.

In other examples, some of the elements in the system 2000 (i.e., NPU, memory, and CPU) may be configured to have independent or separate supply voltages VDD.

In other examples, certain elements of the system 2000 may be configured to receive a second supply voltage that is different from the first supply voltage.

The switching circuit 400 shown in FIG. 9A is configured to receive a selection signal as input. Here, the selection signals may be plural. Each corresponding selection signal may be input to a plurality of neural processing units (e.g., first NPU 100-1 and second NPU 100-2). The selection signals may be determined based on information about the amount of computation for a particular computational step of a particular ANN model processed by the plurality of particular neural processing units, or the utilization rate of PEs within the at least one neural processing unit.

The information may be provided from at least one of the plurality of neural processing units. Alternatively, the information may be provided from at least one of the plurality of CPUs. In this case, a selection signal corresponding to the information may be generated. The selection signal may be generated in the plurality of CPUs or the plurality of neural processing units. The generated selection signal may be transmitted from at least one of the plurality of neural processing units or at least one of the plurality of CPUs to the switching circuit 400. Here, the selection signal may be transmitted to the switching circuit 400 through the system bus 500.

After generating a plurality of clock signals, the switching circuit 400 may select one clock signal from among the plurality of clock signals based on the obtained information. A clock signal of the selected frequency can be transmitted to the corresponding neural processing unit.

To this end, the switching circuit 400 may be a circuit including at least one of a clock source, a clock skipper circuit, a clock divider circuit, a clock gating circuit, an oscillator circuit, a phase loop lock (PLL) circuit, and a selector. The switching circuit 400 may be a circuit that combines at least two of a clock source, a clock skipper circuit, a clock divider circuit, a clock gating circuit, an oscillator circuit, a PLL circuit, and a selector. However, the examples of the present disclosure are not limited thereto.

In another example, the switching circuit 400 may obtain information about the amount of computation or utilization rate of PEs for a particular computational step of a particular ANN model processed by at least one neural processing unit of the plurality of neural processing units. Here, the switching circuit 400 may be configured to generate a selection signal based on the information about the amount of computation or utilization rate of PEs for a particular computational step of a particular ANN model processed by the neural processing unit of at least one of the plurality of neural processing units.

That is, the switching circuit 400 may generate clock signals for each of the plurality of neural processing units (e.g., the first NPU 100-1 and the second NPU 100-2) and then deliver them to the corresponding neural processing units.

For example, the switching circuit 400 provides the first clock signal to the first NPU 100-1 and the second clock signal to the second NPU 100-2. Accordingly, the first NPU 100-1 may be operated according to the first clock signal, and the second NPU 100-2 may be operated according to the second clock signal.

For example, in a specific example, if the amount of computation or PE utilization rate for a computation step of any given layer among the computation steps of the plurality of layers in the first ANN processed by the first NPU 100-1 changes to be higher than the computation step of the previous layer, the selection signal may be instructed to lower the frequency. Accordingly, the switching circuit 400 may select a first clock signal having a frequency lower than the frequency of the computation step of the previous layer and provide it to the first NPU 100-1. Alternatively, the switching circuit 400 may modulate the frequency of the second clock signal of a second frequency to generate a first clock signal of a first frequency, and provide it to the first NPU 100-1.

Conversely, if the amount of computation or PE utilization rate for the computation step of any given layer among the computation steps of the plurality of layers in the second ANN processed by the the second NPU 100-2 changes to be lower than the computation step of the previous layer, the selection signal may be commanded to increase the frequency. Accordingly, the switching circuit 400 may select a second clock signal having a frequency higher than the frequency of the operation step of the previous layer and provide it to the second NPU 100-2. Alternatively, the switching circuit 400 may modulate the frequency of the first clock signal of a first frequency to generate a second clock signal of a second frequency, and provide it to the second NPU 100-2.

In this way, having the first NPU 100-1 and the second NPU 100-2 distributedly operate according to clock signals with different frequencies has the advantage of reducing the power fluctuation of adjacent computational steps and improving the stability of the supply voltage.

Figure 9B:
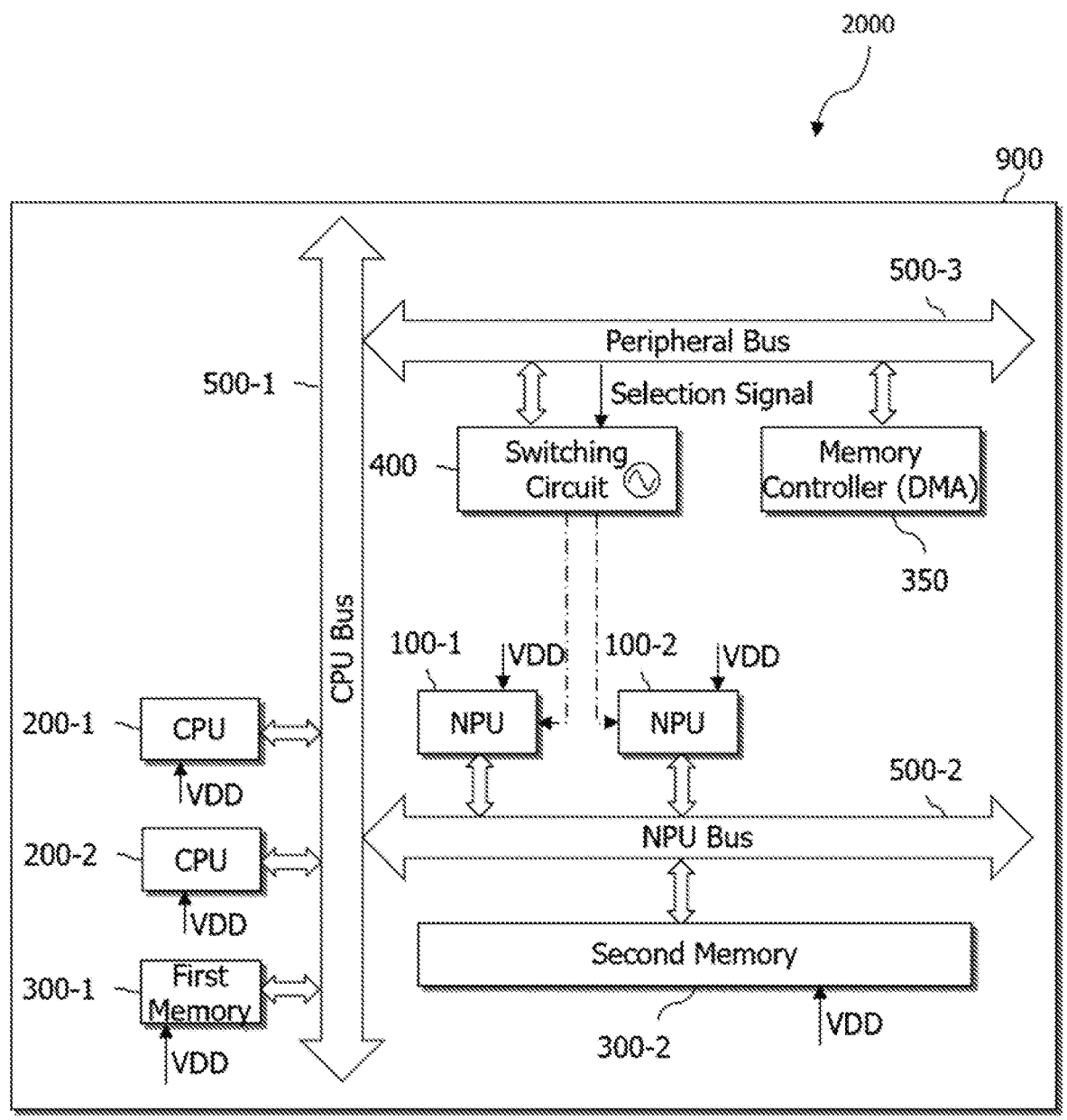
FIG. 9B is an exemplary diagram illustrating the structure of a system according to an example of the second disclosure of the present disclosure.

FIG. 9B is an example diagram illustrating the structure of a system according to the second example of the present disclosure.

Referring to FIG. 9B, an exemplary system 2000 may include a plurality of neural processing units mounted on a substrate 900, a plurality of central processing units (CPUs), and a plurality of memories. The plurality of neural processing units may include, for example, a first NPU 100-1 and a second NPU 100-2. The plurality of CPUs may include, for example, a first CPU 200-1 and a second CPU 200-2. The plurality of memories may include, for example, a first memory 300-1 and a second memory 300-2.

In FIG. 9B, the number of the plurality of neural processing units, the plurality of CPUs, and the plurality of memories is shown to be two, but the number of the plurality of neural processing units, the plurality of CPUs, and the plurality of memories can be varied, such as, but not limited to, four, six, eight, and so forth.

The exemplary system 2000 may include a memory controller 350, switching circuitry 400, a plurality of buses, and an input output (I/O) interface 800.

The plurality of buses may be implemented by electrically conductive patterns formed on the substrate 900.

The plurality of buses may include a bus for a CPU, such as CPU bus 500-1, a bus for a neural processing unit, such as NPU bus 500-2, and a bus for peripheral components, such as peripheral bus 500-3.

The CPU bus 500-1, the first CPU 200-1 and the second CPU 200-2 and the first memory 300-1 may be connected. The NPU bus 500-2, the first NPU 100-1 and the second NPU 100-2 and the second memory 300-2 may be connected. The memory controller 350 and the switching circuit 400 may be connected to the peripheral bus 500-3.

Each element within the system 2000 illustrated in FIG. 9B (i.e., NPU, memory, and CPU) may have a supply voltage VDD input.

In FIG. 9B, a common supply voltage VDD is shown as being input, but examples of the present disclosure are not limited thereto.

In some examples, each element in the system 2000 (i.e., NPU, memory, and CPU) may be configured to have an independent or separate supply voltage VDD input.

In other examples, some of the elements in the system 2000 (i.e., NPU, memory, and CPU) may be configured to have independent or separate supply voltages VDD.

In other examples, certain elements of the system 2000 may be configured to receive a second supply voltage that is different from the first supply voltage.

The switching circuit 400 shown in FIG. 9A is configured to receive a selection signal as input. Here, the selection signals may be plural. Each corresponding selection signal may be input to a plurality of neural processing units (e.g., first NPU 100-1 and second NPU 100-2). The selection signals may be determined based on information about the amount of computation for a particular computational step of a particular ANN model processed by the plurality of particular neural processing units, or the utilization rate of PEs within the at least one neural processing unit.

The information may be provided by at least one of the plurality of neural processing units. Alternatively, the information may be provided by at least one of the plurality of CPUs. In this case, a selection signal corresponding to the information may be generated. The selection signal may be generated by the plurality of CPUs or the plurality of neural processing units. The generated selection signal may be communicated from at least one of the plurality of neural processing units or at least one of the plurality of CPUs to the switching circuit 400. Here, the selection signal may be communicated to the switching circuit 400 via at least one of the NPU bus 500-2, the CPU bus 500-1, and the peripheral bus 500-3.

Alternatively, the information may be provided by at least one of the plurality of CPUs. In this case, the information may be transmitted from at least one of the plurality of neural processing units and then passed to at least one of the plurality of CPUs via the NPU bus 500-2 and the CPU bus 500-1. A selection signal generated by at least one of the plurality of CPUs may be passed to the switching circuit 400 via the CPU bus 500-1 and the peripheral bus 500-3.

After generating a plurality of clock signals, the switching circuit 400 may select one clock signal among the plurality of clock signals based on the obtained information. The clock signal of the selected frequency may be transmitted to the corresponding neural processing unit.

To this end, the switching circuit 400 may be a circuit including at least one of a clock source, a clock skipper circuit, a clock divider circuit, a clock gating circuit, an oscillator circuit, a phase loop lock (PLL) circuit, and a selector. The switching circuit 400 may be a circuit that combines at least two of a clock source, a clock skipper circuit, a clock divider circuit, a clock gating circuit, an oscillator circuit, a PLL circuit, and a selector. However, the examples of the present disclosure are not limited thereto.

In another example, the switching circuit 400 may obtain information about the amount of computation or utilization rate of PEs for a particular computational step of a particular ANN model processed by at least one neural processing unit of the plurality of neural processing units. Here, the switching circuit 400 may be configured to generate a selection signal based on the information about the amount of computation or utilization rate of PEs for a particular computational step of a particular ANN model processed by the neural processing unit of at least one of the plurality of neural processing units.

That is, the switching circuit 400 may generate clock signals for each of the plurality of neural processing units (e.g., the first NPU 100-1 and the second NPU 100-2) and then deliver them to the corresponding neural processing units.

For example, the switching circuit 400 provides the first clock signal to the first NPU 100-1 and the second clock signal to the second NPU 100-2. Accordingly, the first NPU 100-1 may be operated according to the first clock signal, and the second NPU 100-2 may be operated according to the second clock signal.

For example, in a specific example, if the amount of computation or PE utilization rate for a computation step of any given layer among the computation steps of the plurality of layers in the first ANN processed by the first NPU 100-1 changes to be higher than the computation step of the previous layer, the selection signal may be instructed to lower the frequency. Accordingly, the switching circuit 400 may select a first clock signal having a frequency lower than the frequency of the computation step of the previous layer and provide it to the first NPU 100-1. Alternatively, the switching circuit 400 may modulate the frequency of the second clock signal of a second frequency to generate a first clock signal of a first frequency, and provide it to the first NPU 100-1.

Conversely, if the amount of computation or PE utilization rate for the computation step of any given layer among the computation steps of the plurality of layers in the second ANN processed by the the second NPU 100-2 changes to be lower than the computation step of the previous layer, the selection signal may be commanded to increase the frequency. Accordingly, the switching circuit 400 may select a second clock signal having a frequency higher than the frequency of the operation step of the previous layer and provide it to the second NPU 100-2. Alternatively, the switching circuit 400 may modulate the frequency of the first clock signal of a first frequency to generate a second clock signal of a second frequency, and provide it to the second NPU 100-2.

In this way, the first NPU 100-1 and the second NPU 100-2 can be distributedly operated according to different clock signals, which has the advantage of reducing the power deviation of adjacent computational steps and improving the stability of the supply voltage.

Figure 10A:
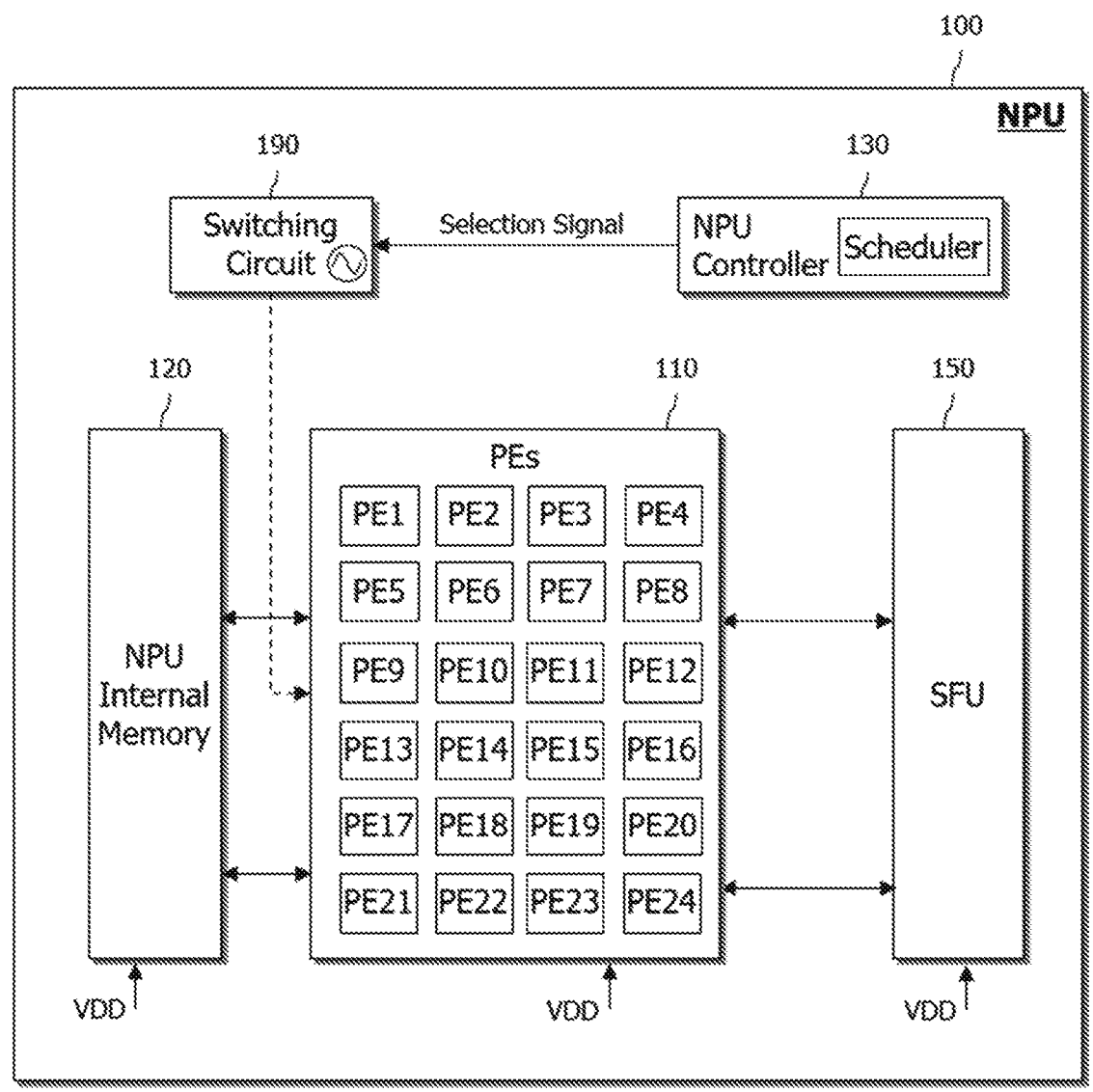
FIG. 10A is an exemplary diagram illustrating the structure of a neural processing unit according to an example of the third disclosure of the present disclosure.

FIG. 10A is an exemplary diagram illustrating a structure of a neural processing unit, according to the third example of the present disclosure.

In FIG. 10A, a neural processing unit 100 is shown to include a plurality of PEs 110, internal memory 120, an SFU 150, and a switching circuit 190. However, the neural processing unit 100 may further include an NPU controller 130 and an NPU interface 140, as shown in FIG. 3 or 5. Each of the plurality of PEs 110, the internal memory 120, the NPU controller 130, the NPU interface 140, the SFU 150, and the clock generator 190 may be a semiconductor circuit with numerous transistors connected thereto. As such, some of them may be difficult to identify and distinguish with the naked eye, and may be identified only by their operation. The switching circuit 190 may be referred to as a clock signal supply circuit.

For example, a particular circuit may operate as a plurality of PEs 110 or as an NPU controller 130.

The plurality of PEs 110 may include adders, multipliers, and accumulators.

The switching circuit 400 as shown in FIG. 10A may be a circuit including at least one of a clock source, a clock skipper circuit, a clock divider circuit, a clock gating circuit, an oscillator circuit, a phase loop lock (PLL) circuit, and a selector. The switching circuit 400 may be a circuit that combines at least two of a clock source, a clock skipper circuit, a clock divider circuit, a clock gating circuit, an oscillator circuit, a PLL circuit, and a selector. However, the examples of the present disclosure are not limited thereto.

The neural processing unit 100 may obtain information about the amount of computation or the utilization rate of the PEs for a particular computational step of a particular ANN model processed in the plurality of PEs 110. Here, the neural processing unit 100 may be configured to generate a selection signal based on the information about the amount of computation or utilization rate of the PEs for a particular computational step of a particular ANN model processed by at least one neural processing unit of the plurality of neural processing units.

In another example, the switching circuit 190 may obtain information about the amount of computation or utilization rate of PEs for a particular computational step of a particular ANN model processed by the neural processing unit 100. Here, the switching circuit 190 may be configured to generate a selection signal based on the information about the amount of computation or the utilization rate of the PEs for a particular computational step of the particular ANN model processed by the neural processing unit 100.

The switching circuit 190 may output a clock signal of a corresponding frequency in response to the selection signal.

The information may be provided by a scheduler within the NPU controller 130.

Among the computation steps of the plurality of layers in the first ANN processed by the neural processing unit 100, if the computation amount or the PE utilization rate for the computation step of any given layer changes to be higher than the computation step of the previous layer, the selection signal may be instructed to lower the frequency. Accordingly, the switching circuit 190 may select a first clock signal having a frequency lower than the frequency of the computation step of the previous layer and provide it to the plurality of PEs 110. Alternatively, the switching circuit 190 may modulate the frequency of the second clock signal of a second frequency to generate a first clock signal of a first frequency, which may be provided to the plurality of PEs 110.

Conversely, if the amount of computation or the utilization rate of PEs for a computation step of any given layer among the computation steps of the plurality of layers in the first ANN processed by the neural processing unit 100 changes to be lower than the computation step of the previous layer, the selection signal may be instructed to increase the frequency. Accordingly, the switching circuit 190 may select a second clock signal having a frequency higher than the frequency of the computation step of the previous layer and provide it to the plurality of PEs 110. Alternatively, said switching circuit 190 may modulate the frequency of said first clock signal of a first frequency to generate a second clock signal of a second frequency, which may be provided to said plurality of PEs 110.

In this way, the first NPU 100-1 and the second NPU 100-2 can be distributedly operated according to different clock signals, which has the advantage of reducing the peak power fluctuation of adjacent computational steps and improving the stability of the supply voltage.

Figure 10B:
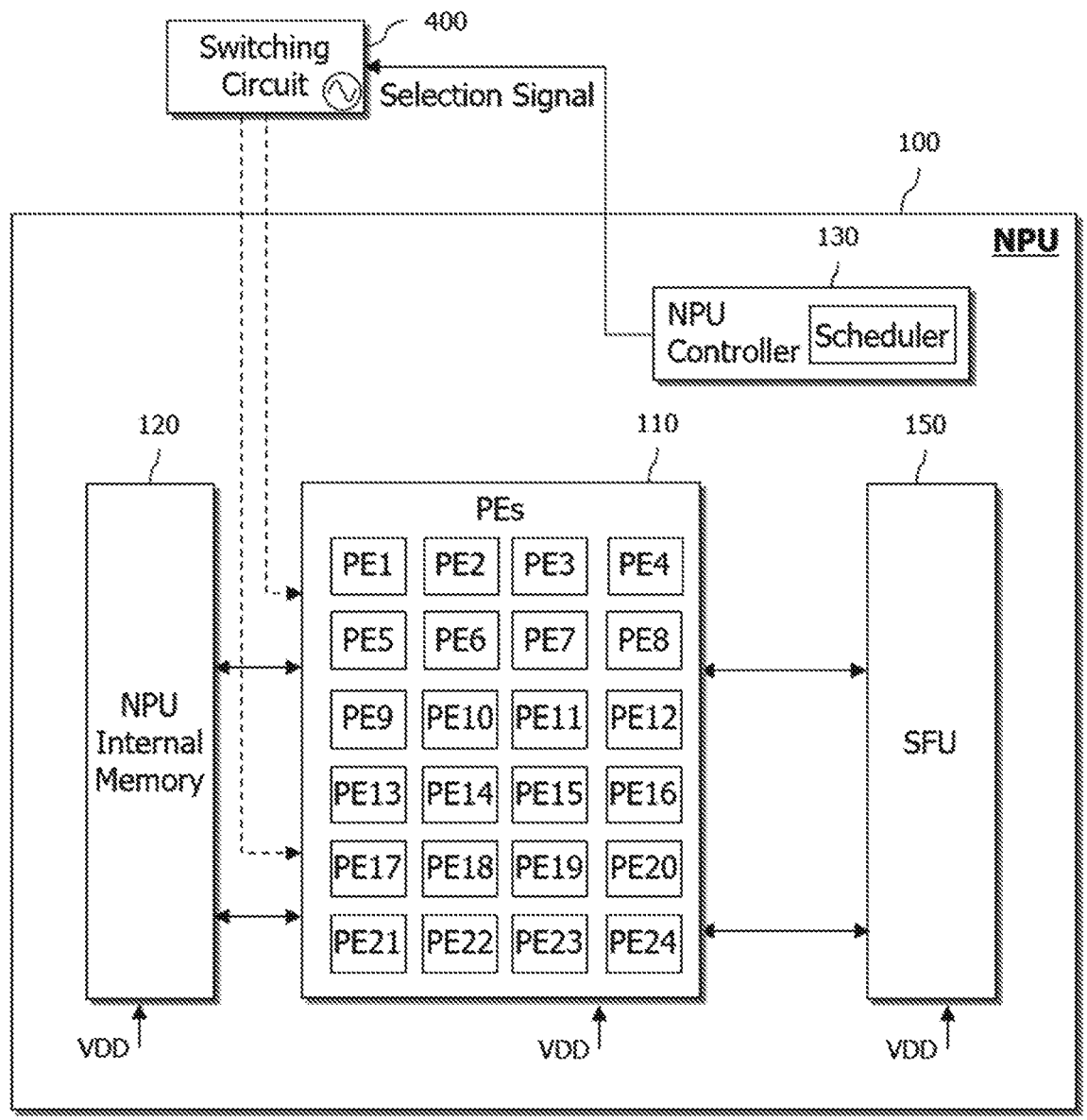
FIG. 10B is an exemplary diagram illustrating the structure of a neural processing unit according to another example of the third disclosure of the present disclosure.

FIG. 10B is an illustrative diagram of a structure of a neural processing unit according to the third example of the present disclosure.

In FIG. 10B, a neural processing unit 100 is shown to include a plurality of PEs 110, internal memory 120, and SFU 150. However, the neural processing unit 100 may further include an NPU controller 130 and an NPU interface 140 as shown in FIG. 3 or 5. Each of the plurality of PEs 110, the internal memory 120, the NPU controller 130, the NPU interface 140, and the SFU 150 may be semiconductor circuits with numerous transistors connected thereto. As such, some of them may be difficult to identify and distinguish with the naked eye, and may be identified only by operation thereof.

Referring to FIG. 10B, the switching circuit 400 is shown to be located outside the neural processing unit 100, not inside. Other than that, since it is the same as that shown in FIG. 10A, a separate description of FIG. 10B will not be made, and the content explained with reference to FIG. 10A will be used as is.

On the one hand, although not shown in FIGS. 10A and 10B, the SFU 150 may be directly connected to the NPU internal memory 120.

On the other hand, although FIGS. 10A and 10B illustrate a neural processing unit, said neural processing unit may be implemented in the form of an SoC.

Figure 11:
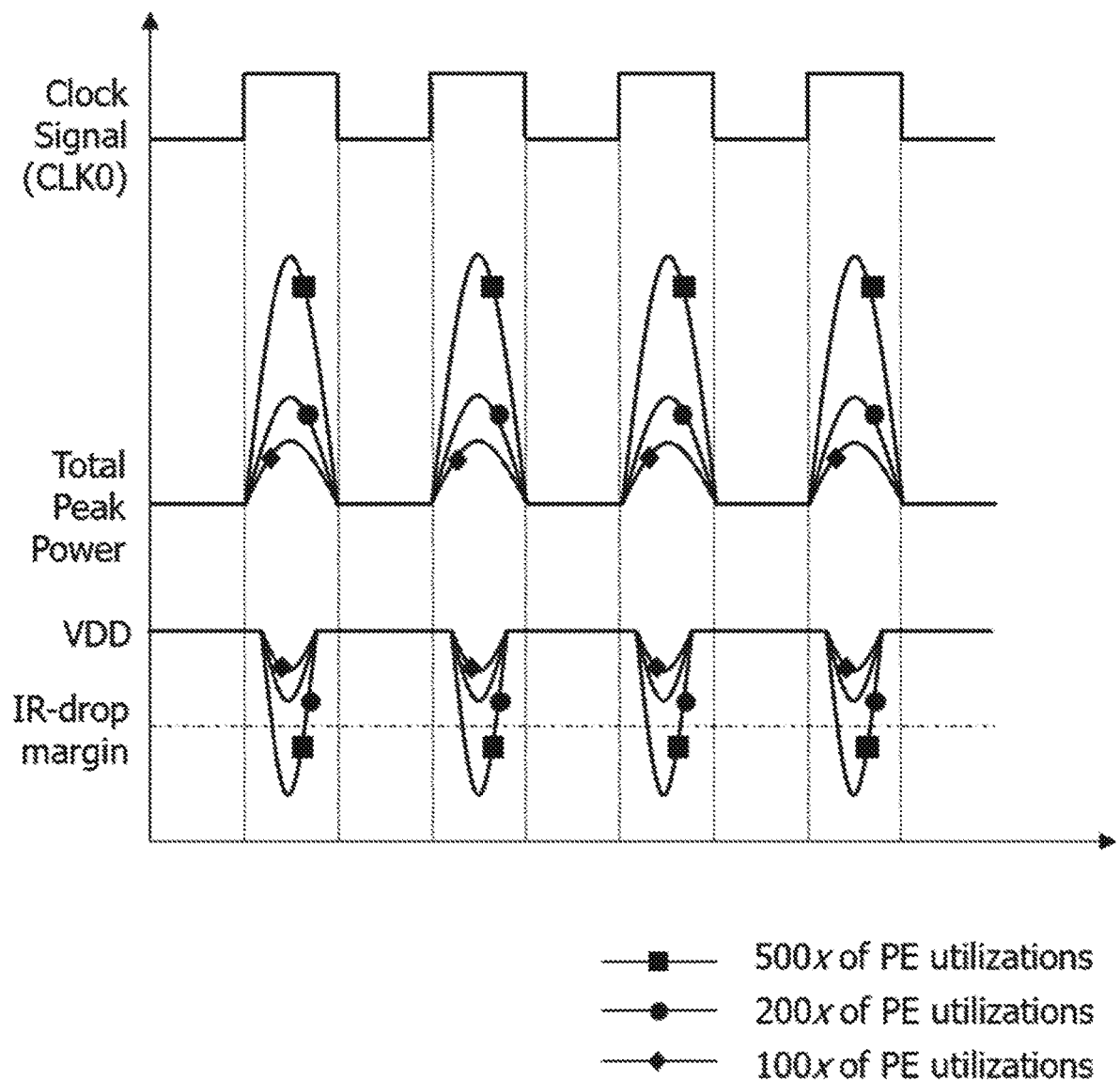
FIG. 11 illustrates an example in which peak power increases as the utilization rate of PEs increases.

FIG. 11 illustrates an example where the peak power increases as the utilization rate of PEs increases.

Referring to FIG. 11, a clock signal CLK0 may be input to a plurality of neural processing units 100-1, 100-2. Here, the plurality of neural processing units 100-1, 100-2 are configured to receive clock signals of the same phase. The plurality of neural processing units may include the first NPU 100-1 and the second NPU 100-2.

The 100× of PE utilization of FIG. 11 exemplarily illustrates the peak power and supply voltage VDD variation characteristics when one hundred processing elements are activated.

The 200× of PE utilization in FIG. 11 illustrates exemplary peak power and supply voltage VDD variation characteristics when two hundred processing elements are activated.

The 500× of PE utilization in FIG. 11 illustrates exemplary peak power and supply voltage VDD variation characteristics when five hundred processing elements are activated.

Referring to FIG. 11, it is illustrated that as the number of processing elements of the neural processing unit 100 activated increases, the peak power increases and the supply voltage VDD tends to decrease.

Additionally, the number of PEs operating in each clock cycle may depend on the performance of the compiler that compiles the neural network model, i.e., the better the performance of the compiler, the more PEs can be operated per unit clock. The percentage of working PEs out of the total PEs can be referred to as the utilization rate % of PEs. Conversely, the better the performance of the compiler, the more the peak power of the neural processing units can be increased, i.e., the peak power can be directly proportional to the utilization rate of the PEs. Thus, the problem is that as the compiler's algorithms become more sophisticated, the peak power of the neural processing unit may increase further.

Referring again to FIG. 11, the peak power when operating relative to the clock signal CLK0 may depend on the number of PEs operating each clock, i.e., the peak power may increase in proportion to the number of PEs operating in a single clock.

In addition, neural processing units developed for low power applications can be developed for either the M.2 interface or the PCI express interface when applied to edge devices. In particular, the M.2 interface may have a relatively lower maximum power compared to the PCI express interface. For example, an M.2 interface may have a current limit of 3 A and a power limit of 10 W. If the peak power exceeds 10 W at a given clock, the supply voltage VDD may fluctuate. In this case, as the utilization rate of PE increases, the peak power increases further, and as the peak power exceeds the power limit, the degree of degradation of the supply voltage VDD may be greater in proportion to the excess information.

If the supply voltage VDD drops below the IR-drop margin, it can cause errors in the data being computed by the neural processing unit. In addition, an IR-drop can occur when the resistance (R) of a metal interconnect and the current (I) flowing through it cause a voltage drop (V=IR) according to Ohm's law. The simultaneous switching of a large number of circuits associated with multiple PEs in a neural processing unit can cause the neural processing unit to drain a significant amount of current. This high current can cause a larger voltage drop in the neural processing unit, which can reduce the supply voltage in other parts of the SoC.

To summarize the example in FIG. 11, to ensure reliable operation of the neural processing unit and avoid potential errors, it is important to ensure sufficient IR-drop margin. The IR-drop margin may be the difference between the supply voltage VDD and the lowest allowable voltage at any point on the neural processing unit during peak power conditions.

According to examples of the present disclosure, the IR-drop margin may be predicted based on the utilization rate of PEs in a particular computational stage of a particular neural network model. Thus, if the IR-drop margin is expected to fall below a threshold, a selection signal may be determined based on the utilization of the PEs and the IR-drop margin to ensure the IR-drop margin.

Figure 12:
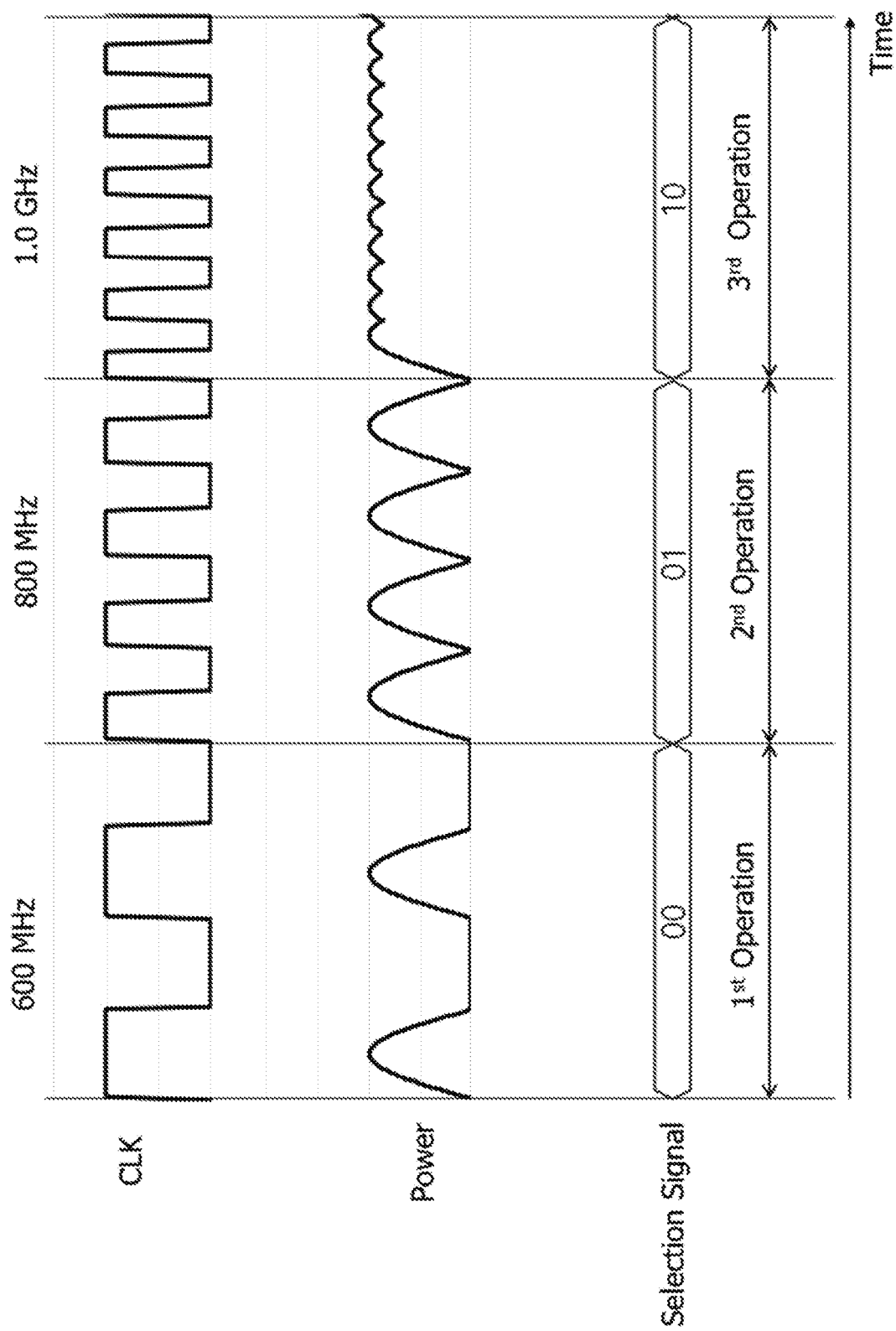
FIG. 12 illustrates an example of power when clock signals are used differently depending on the utilization rates of PEs.

FIG. 12 shows an example of the power when using different clock signals based on the utilization rate of PEs.

FIG. 12 illustrates three computational stages of a particular neural network model along the time axis. The example shows the power characteristics of one processing element PE as a function of drive frequency. Referring to FIG. 12, the power increases progressively with frequency.

For example, as shown in Table 2 below, the selection circuit 400 may be designed to selectively output clock signals of a predetermined frequency. Thus, when a certain selection signal is input to the switching circuit 400, a clock signal corresponding to said selection signal may be supplied to the neural processing unit.

TABLE 2

| Frequency | Selection Signal |
|---|---|
| 600 MHz | 00 |
| 800 MHz | 01 |
| 1.0 GHz | 10 |
| 1.2 GHz | 11 |

Considering FIG. 11 again and referring to FIG. 12, it should be noted that as the utilization rate of the processing elements increases, the power may increase proportionally. Accordingly, the power of each computation step can be calculated based on the utilization rate information of the PEs of each computation step or each layer of an ANN and the drive frequency information. The power calculation can be calculated based on the scheduling information of a specific neural network model. Here, the power (Watt) may be calculated as the energy consumed by the corresponding computation step divided by the unit time (i.e., 1 watt (W)=1 joule per second (J/s)). Therefore, the power of each computation step can be calculated based on the scheduling information.

For example, the power of the 600 MHz section is lower than the power of the 800 MHz section, and the power of the 800 MHz section is lower than the power of the 1.0 GHz section.

The switching circuit 400 supplies a first clock signal of 600 MHz to the neural processing unit according to the input first selection signal 00. Accordingly, the first selection signal 00 is supplied during the first computation step according to the scheduling information. The first selection signal 00 may be selected based on the PE utilization rate of the corresponding computation step. The PE utilization rate of the first computation step may be higher than the PE utilization rate of the second computation step.

The switching circuit 400 supplies a second clock signal of 800 MHz to the neural processing unit according to the input second selection signal 01. The second select signal 01 is supplied during the second computation step according to the scheduling information. The second selection signal 01 may be selected based on the PE utilization rate of the corresponding computation step. The PE utilization rate of the second computation step may be higher than the PE utilization rate of the third computation step.

The switching circuit 400 supplies a third clock signal of 1.0 GHz to the neural processing unit according to the input third selection signal 10. The third selection signal 10 is supplied during the third computation step according to the scheduling information. The third selection signal 10 may be selected based on the PE utilization rate of the corresponding computation step. The PE utilization rate of the third computation step may be lower than the PE utilization rate of the second computation step.

In some examples, the system including the neural processing unit, the SoC including the neural processing unit, and the SoC including the neural processing unit may further include a temperature sensor. In some examples, it is also possible to selectively set the drive frequency to a lower value under conditions above a certain threshold temperature.

As the utilization rate of PEs in a particular computation step increases, the power of that computation step may not increase instantaneously due to the use of lower frequency clock signals. In other words, as the utilization rate of PEs increases, the peak power may increase, resulting in the supply VDD dropping below the IR-drop margin. In other words, as the utilization rate of PEs increases, lower frequency clock signals may optionally be used to suppress the supply VDD from dropping below the IR-drop margin.

<Summary of the Present Disclosures>

The following summarizes the disclosures of the present disclosure.

A system may be provided. The system may comprise a neural processing unit (NPU) including a plurality of processing elements (PEs) capable of performing computations for at least one artificial neural network (ANN) model; and a switching circuit. The switching circuit may be configured to select one clock signal among a plurality of clock signals having different frequencies, and supply the selected clock signal to the NPU. The one clock signal is selected based on a utilization rate of the plurality of PEs for a particular layer among a plurality of layers of the at least one ANN model.

The one clock signal may be selected by further considering a threshold value of the utilization rate of the plurality of PEs.

A threshold value may be determined for the utilization rate of the plurality of PEs to reduce power of performing operations on the particular layer.

When the NPU has completed computation on a layer earlier than the particular layer of the at least one ANN model, the one clock signal may be selected.

The one clock signal may be selected for the particular layer of the at least one ANN model based on information from an output of a layer earlier than the particular layer processed by the NPU.

The switching circuit may include a generator that outputs the plurality of clock signals and a selector that selects the one clock signal.

If the utilization rate for the particular layer is higher than a previous layer, the one clock signal selected for the particular layer may have a second frequency lower than a first frequency of the previous layer.

If the utilization rate for the particular layer is lower than a previous layer, the one clock signal selected for the particular layer may have a second frequency higher than a first frequency of the previous layer.

The utilization rate of the plurality of PEs may be determined for each of the plurality of layers of the at least one ANN model.

The utilization rate of the plurality of PEs may be determined based on scheduling information used to assign operations for each layer of the at least one ANN model to the plurality of PEs.

A system-on-chip (SoC) may be provided. The SoC may comprise a first circuitry including a plurality of processing elements (PEs) capable of performing computations for at least one artificial neural network (ANN) model; and a second circuitry configured to select one clock signal among a plurality of clock signals having different frequencies, and supply the selected clock signal to the first circutary. The one clock signal may be selected based on a utilization rate of the plurality of PEs for a particular layer among a plurality of layers of the at least one ANN model.

The one clock signal may be selected by further considering a threshold value of the utilization rate of the plurality of PEs.

A threshold value may be determined for the utilization rate of the plurality of PEs to reduce power of performing operations on the particular layer.

When the first circuitry has completed computation on a layer earlier than the particular layer of the at least one ANN model, the one clock signal may be selected.

The one clock signal may be selected for the particular layer of the at least one ANN model based on information from an output of a layer earlier than the particular layer processed by the first circuitry.

If the utilization rate for the particular layer is higher than a previous layer, the one clock signal selected for the particular layer may have a second frequency lower than a first frequency of the previous layer.

If the utilization rate for the particular layer is lower than a previous layer, the one clock signal selected for the particular layer may have a second frequency higher than a first frequency of the previous layer.

A method of operating a neural processing unit (NPU) may be provided. The method may comprise selecting one clock signal from a plurality of clock signals having different frequencies; and supplying the selected clock signal to the NPU. The NPU may include a plurality of processing elements (PEs) capable of performing operations for at least one artificial neural network (ANN) model. The one clock signal may be selected based on a utilization rate of the plurality of PEs for a particular layer among the plurality of layers in the at least one ANN model.

The one clock signal may be selected by further considering a threshold value of the utilization rate of the plurality of PEs.

A threshold value may be determined for the utilization rate of the plurality of PEs to reduce power of performing operations on the particular layer.

Examples of the present disclosure described in the present disclosure and drawings are merely presented as specific examples to easily explain the technical content of the present disclosure and help understanding of the present disclosure, and are not intended to limit the scope of the present disclosure. It is apparent to those of ordinary skill in the art that other modified examples can be implemented or derived in addition to the examples described.

[National R&D Project Supporting This Invention]

[Task Identification Number] 1711193247

[Task Number] 2022-0-00248-002

[Name of Ministry] Ministry of Science and ICT

[Name of Project Management (Specialized) Institution] Institute of Information & Communications Technology Planning & Evaluation

[Research Project Title] Development of Core Technology for PIM Artificial Intelligence Semiconductor (Design)

[Research Task Title] Development of CXL-based PIM semiconductor technology for multiple DRAM modules considering memory consistency

[Contribution Rate]1/1

[Name of Organization Performing the Task] DeepX Co., Ltd.

[Research period] 2023 Jan. 1~2023 Dec. 31

What is claimed is:

1. A system comprising:
   a neural processing unit (NPU) including a plurality of processing elements (PEs) capable of performing computations for at least one artificial neural network (ANN) model; and
   a switching circuit,
   wherein the switching circuit is configured to select one clock signal among a plurality of clock signals having different frequencies, and supply the selected clock signal to the NPU,
   wherein the one clock signal is selected based on a comparison between a utilization rate of the plurality of PEs for a particular layer among a plurality of layers of the at least one ANN model and a utilization rate for a layer earlier than the particular layer, and
   wherein, when the utilization rate of the plurality of PEs for the particular layer is higher than the utilization rate for the layer earlier than the particular layer, the one clock signal selected for the particular layer has a second frequency lower than a first frequency of the layer earlier than the particular layer.

2. The system of claim 1,
   wherein the one clock signal is selected by further considering a threshold value of the utilization rate of the plurality of PEs.

3. The system of claim 1,
   wherein a threshold value is determined for the utilization rate of the plurality of PEs to reduce power of performing operations on the particular layer.

4. The system of claim 1,
   wherein when the NPU has completed computation on a layer earlier than the particular layer of the at least one ANN model, the one clock signal is selected.

5. The system of claim 1,
   wherein the one clock signal is selected for the particular layer of the at least one ANN model based on information from an output of the layer earlier than the particular layer processed by the NPU.

6. The system of claim 1,
   wherein the switching circuit further includes a generator configured to output the plurality of clock signals and a selector configured to select the one clock signal.

7. The system of claim 1,
   wherein the utilization rate of the plurality of PEs is determined for each of the plurality of layers of the at least one ANN model.

8. The system of claim 1,
   wherein the utilization rate of the plurality of PEs is determined based on scheduling information used to assign operations for each layer of the at least one ANN model to the plurality of PEs.

9. A system comprising:
   a neural processing unit (NPU) including a plurality of processing elements (PEs) capable of performing computations for at least one artificial neural network (ANN) model; and
   a switching circuit,
   wherein the switching circuit is configured to select one clock signal among a plurality of clock signals having different frequencies, and supply the selected clock signal to the NPU,
   wherein the one clock signal is selected based on a comparison between a utilization rate of the plurality of PEs for a particular layer among a plurality of layers of the at least one ANN model and a utilization rate for a layer earlier than the particular layer, and
   wherein, when the utilization rate of the plurality of PEs for the particular layer is lower than the utilization rate for the layer earlier than the particular layer, the one clock signal selected for the particular layer has a second frequency higher than a first frequency of the layer earlier than the particular layer.

10. A system-on-chip (SoC) comprising:
    a first circuitry including a plurality of processing elements (PEs) capable of performing computations for at least one artificial neural network (ANN) model; and
    a second circuitry configured to select one clock signal among a plurality of clock signals having different frequencies, and supply the selected clock signal to the first circuitry,
    wherein the one clock signal is selected based on a comparison between a utilization rate of the plurality of PEs for a particular layer among a plurality of layers of the at least one ANN model and a utilization rate for a layer earlier than the particular layer, and
    wherein, when the utilization rate of the plurality of PEs for the particular layer is higher than the utilization rate for the layer earlier than the particular layer, the one clock signal selected for the particular layer has a second frequency lower than a first frequency of the layer earlier than the particular layer.

11. The SoC of claim 10,
    wherein the one clock signal is selected by further considering a threshold value of the utilization rate of the plurality of PEs.

12. The SoC of claim 10,
    wherein a threshold value is determined for the utilization rate of the plurality of PEs to reduce power of performing operations on the particular layer.

13. The SoC of claim 10,
    wherein when the first circuitry has completed computation on the layer earlier than the particular layer of the at least one ANN model, the one clock signal is selected.

14. The SoC of claim 10,
    wherein the one clock signal is selected for the particular layer of the at least one ANN model based on information from an output of the layer earlier than the particular layer processed by the first circuitry.

15. A system-on-chip (SoC) comprising:
    a first circuitry including a plurality of processing elements (PEs) capable of performing computations for at least one artificial neural network (ANN) model; and
    a second circuitry configured to select one clock signal among a plurality of clock signals having different frequencies, and supply the selected clock signal to the first circuitry,
    wherein the one clock signal is selected based on a comparison between a utilization rate of the plurality of PEs for a particular layer among a plurality of layers of the at least one ANN model and a utilization rate for a layer earlier than the particular layer, and
    wherein, when the utilization rate of the plurality of PEs for the particular layer is lower than the utilization rate for the layer earlier than the particular layer, the one clock signal selected for the particular layer has a second frequency higher than a first frequency of the layer earlier than the particular layer.

16. A method of operating a neural processing unit (NPU) comprising:
- selecting one clock signal from a plurality of clock signals having different frequencies; and
- supplying the selected clock signal to the NPU,
- wherein the NPU includes a plurality of processing elements (PEs) capable of performing operations for at least one artificial neural network (ANN) model,
- wherein the one clock signal is selected based on a comparison between a utilization rate of the plurality of PEs for a particular layer among a plurality of layers in the at least one ANN model and a utilization rate for a layer earlier than the particular layer, and
- wherein, when the utilization rate of the plurality of PEs for the particular layer is higher than the utilization rate for the layer earlier than the particular layer, the one clock signal selected for the particular layer has a second frequency lower than a first frequency of the layer earlier than the particular layer.

17. The method of claim 16,
- wherein the one clock signal is selected by further considering a threshold value of the utilization rate of the plurality of PEs.

18. The method of claim 16,
- wherein a threshold value is determined for the utilization rate of the plurality of PEs to reduce power of performing operations on the particular layer.

* * * * *